F. C. NEWELL.
MUTOGRAPH.
APPLICATION FILED NOV. 16, 1907.

976,093.

Patented Nov. 15, 1910.
17 SHEETS—SHEET 1.

WITNESSES
Harvey L. Lechner
J. C. Bradley

INVENTOR
F. C. Newell
by atty
Paul Synnestvedt

F. C. NEWELL.
MUTOGRAPH.
APPLICATION FILED NOV. 16, 1907.

976,093.

Patented Nov. 15, 1910.
17 SHEETS—SHEET 3.

WITNESSES
Harvey L. Lechner
J. C. Bradley

INVENTOR
F. C. Newell
by atty
Paul Synnestvedt

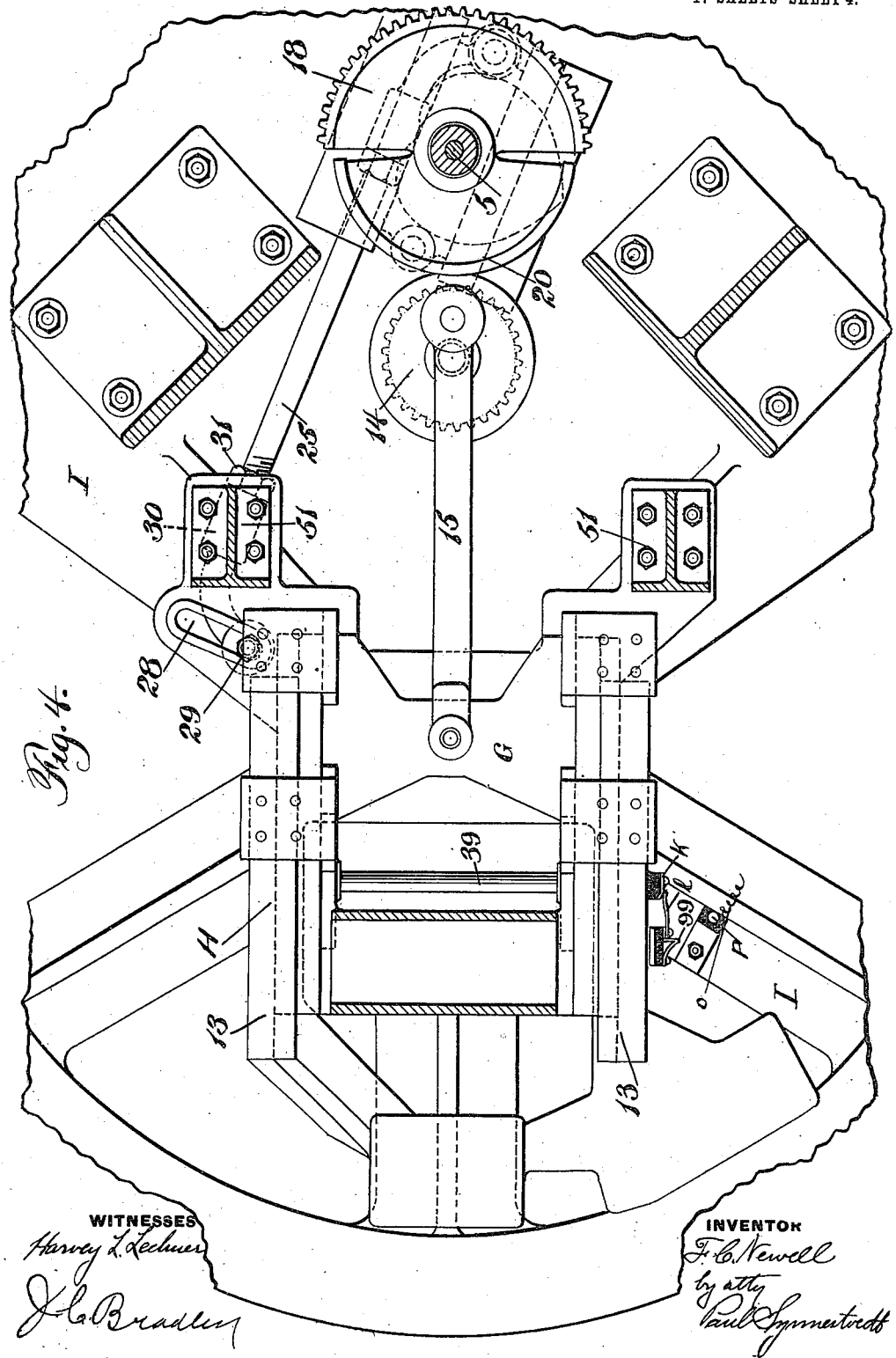

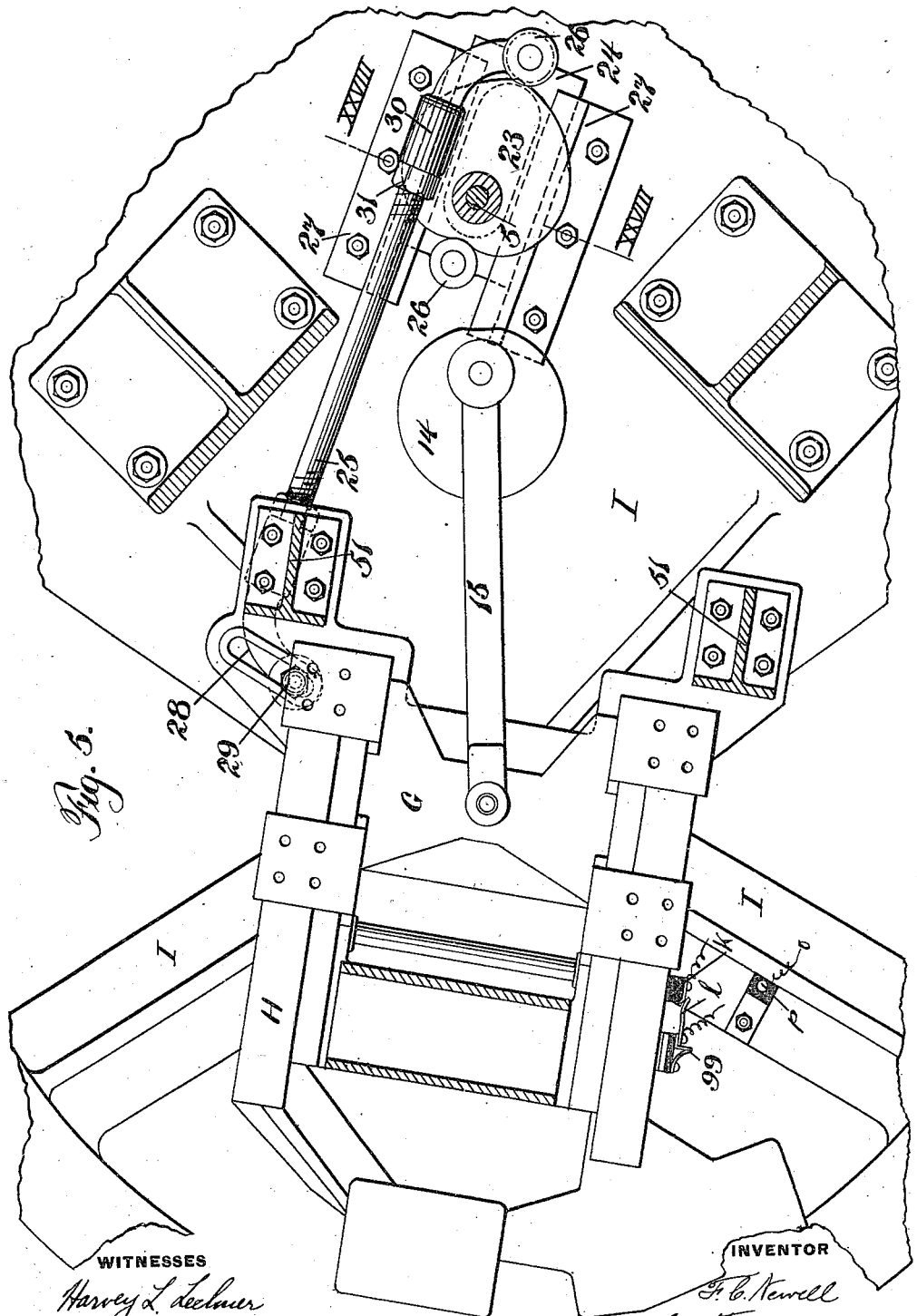

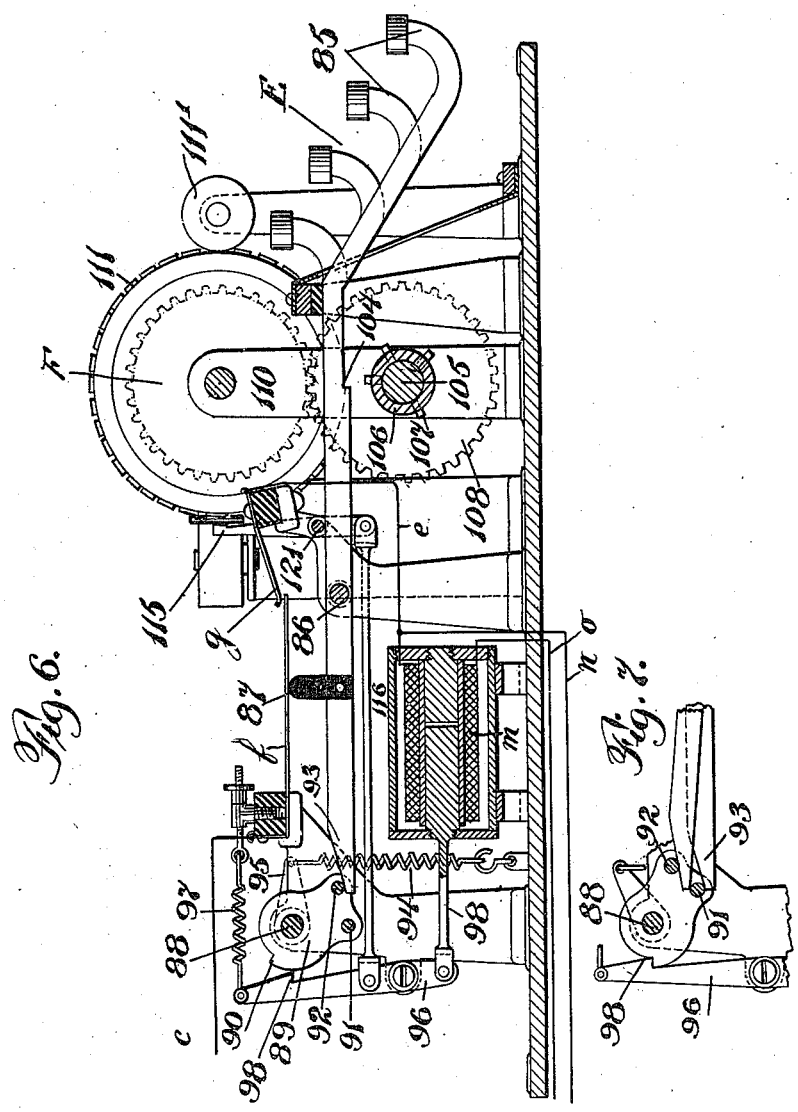

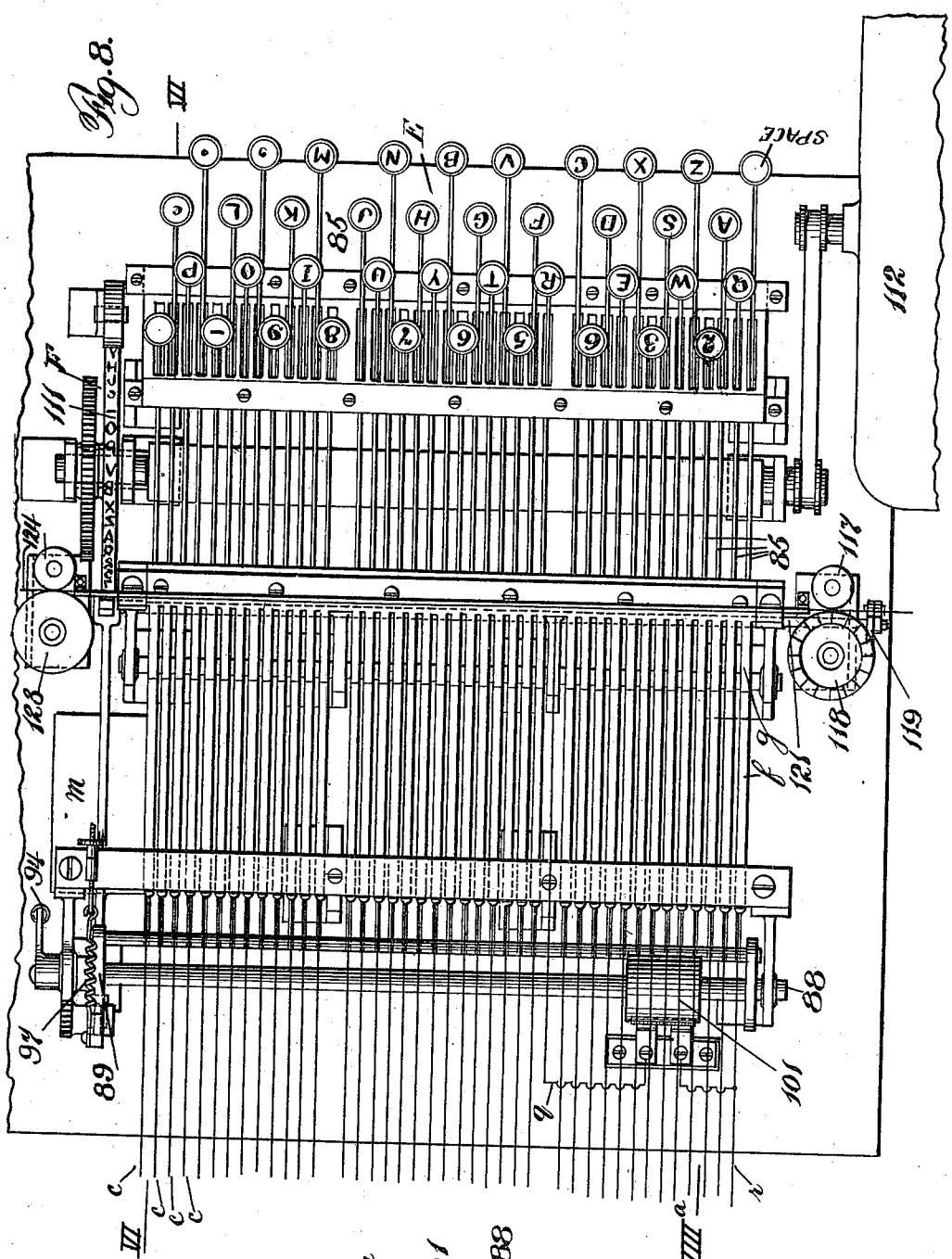

F. C. NEWELL.
MUTOGRAPH.
APPLICATION FILED NOV. 16, 1907.
976,093.
Patented Nov. 15, 1910.
17 SHEETS—SHEET 8.
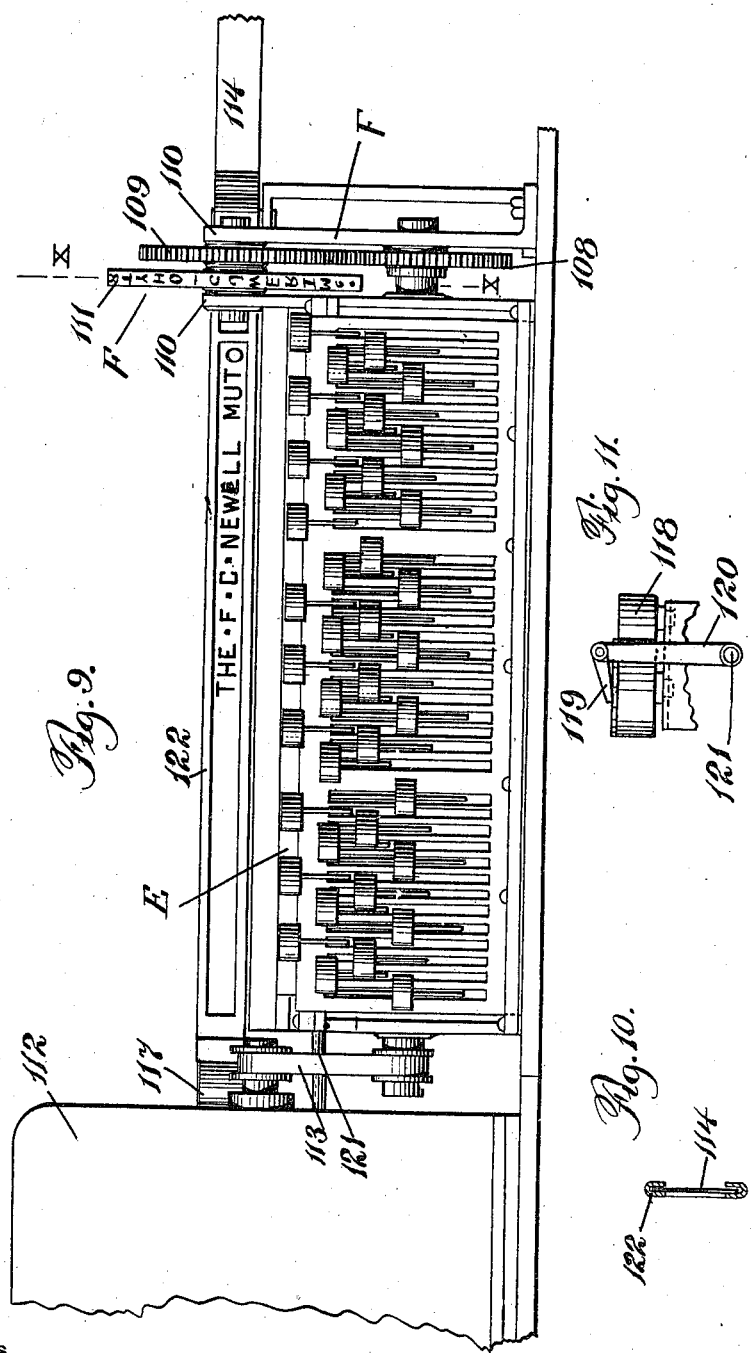
WITNESSES
INVENTOR

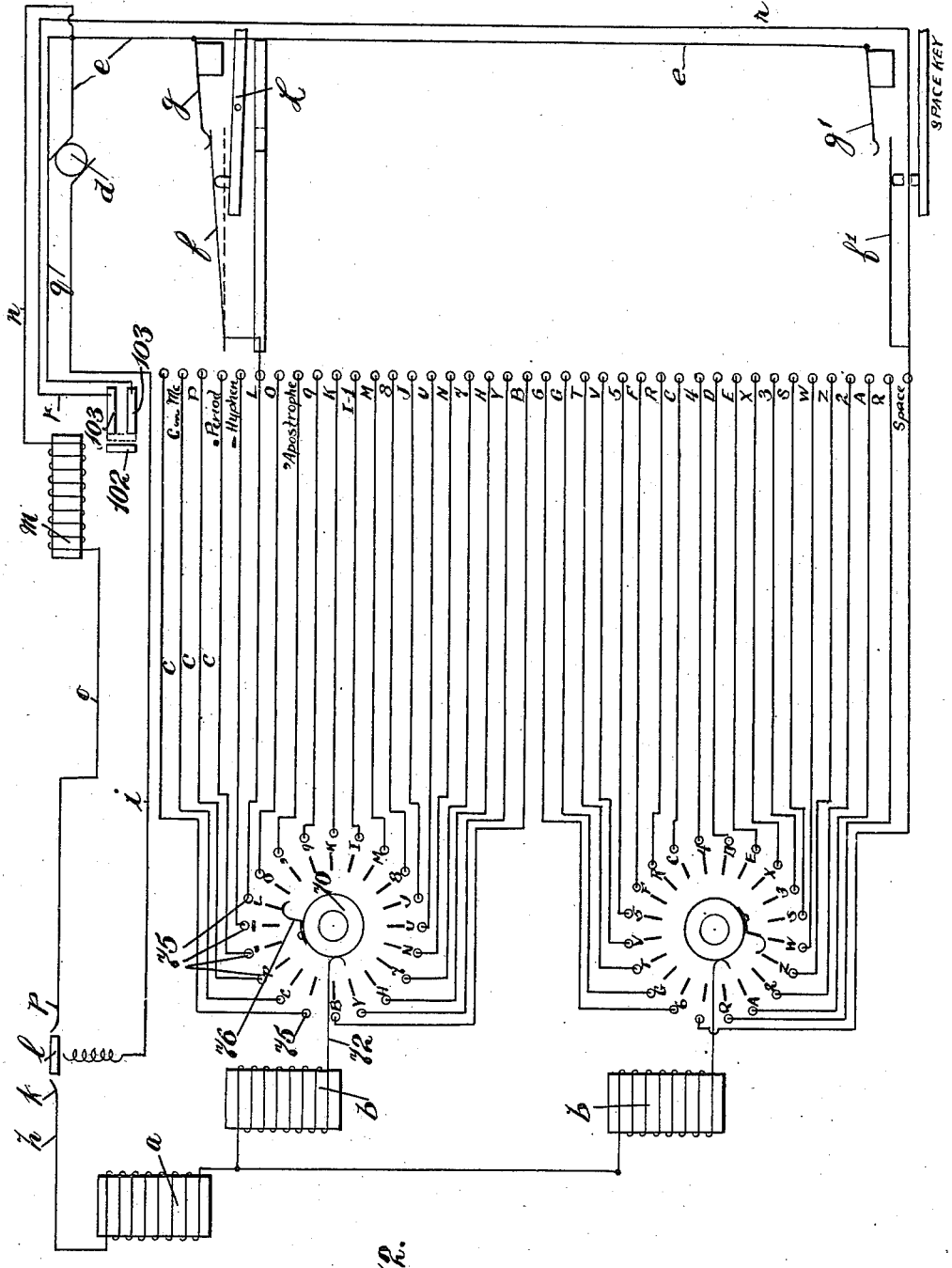

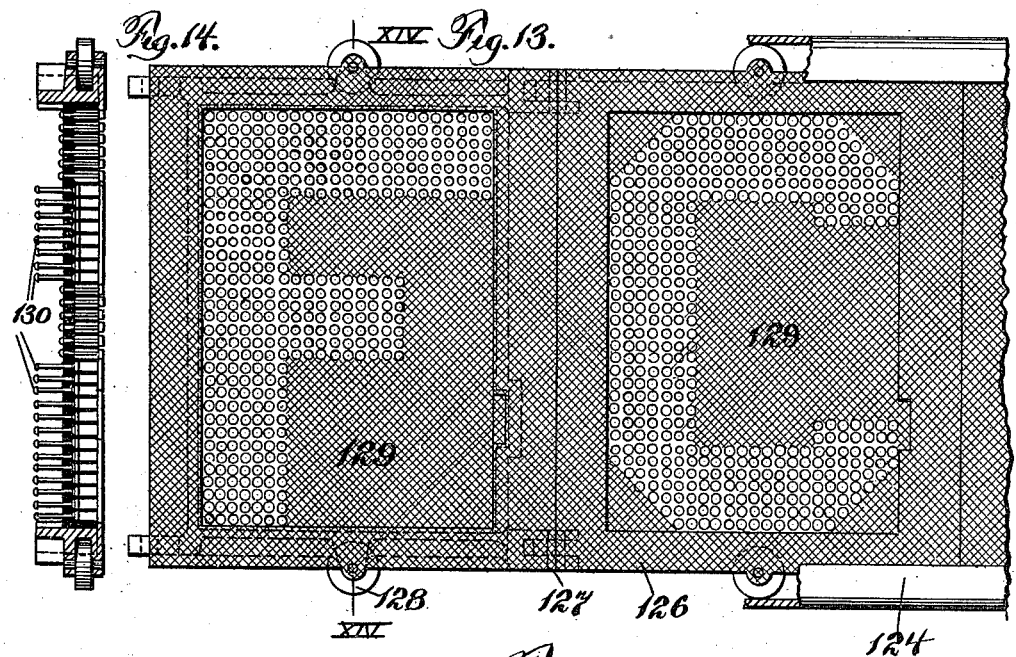
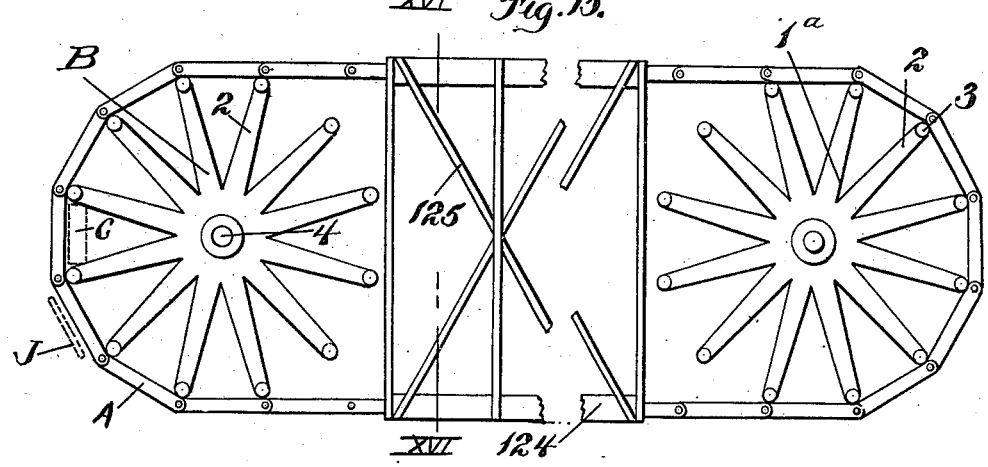
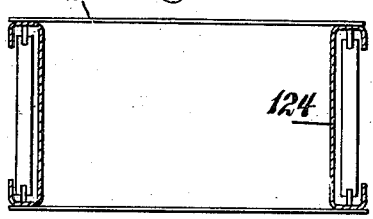

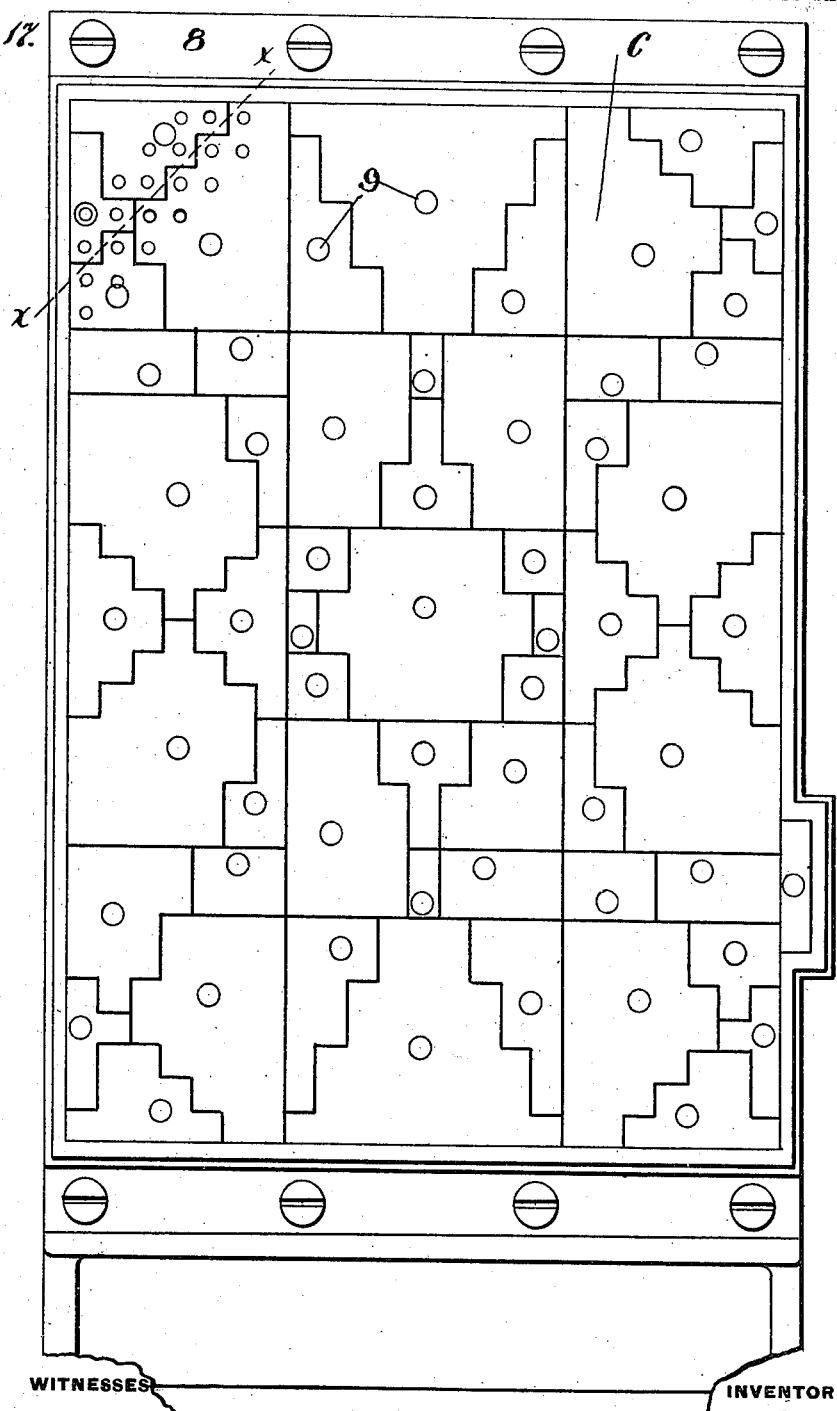

F. C. NEWELL.
MUTOGRAPH.
APPLICATION FILED NOV. 16, 1907.
976,093.
Patented Nov. 15, 1910.
17 SHEETS—SHEET 12.
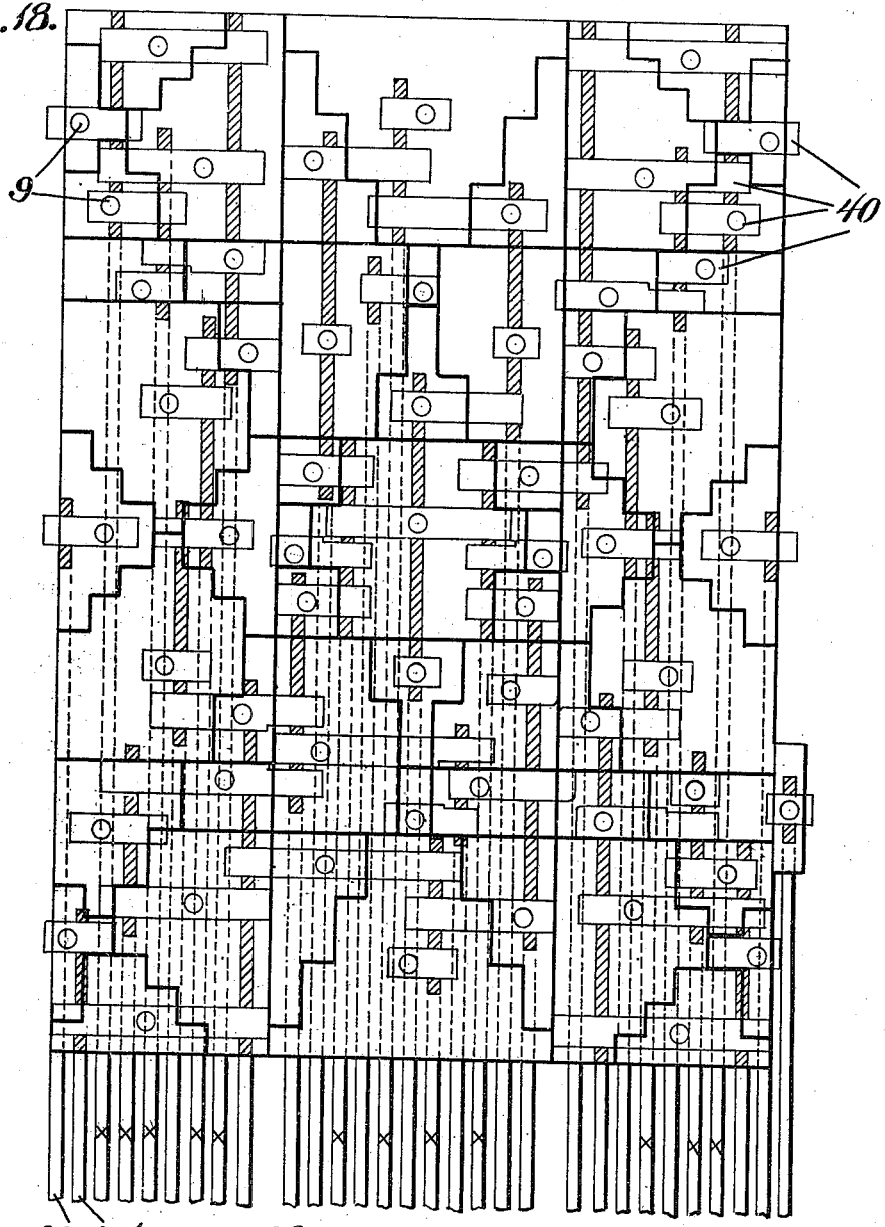
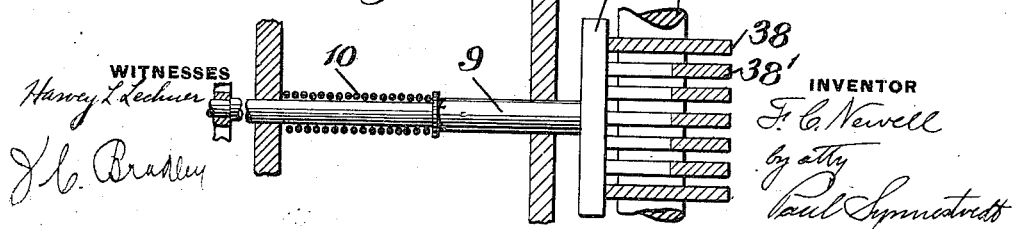

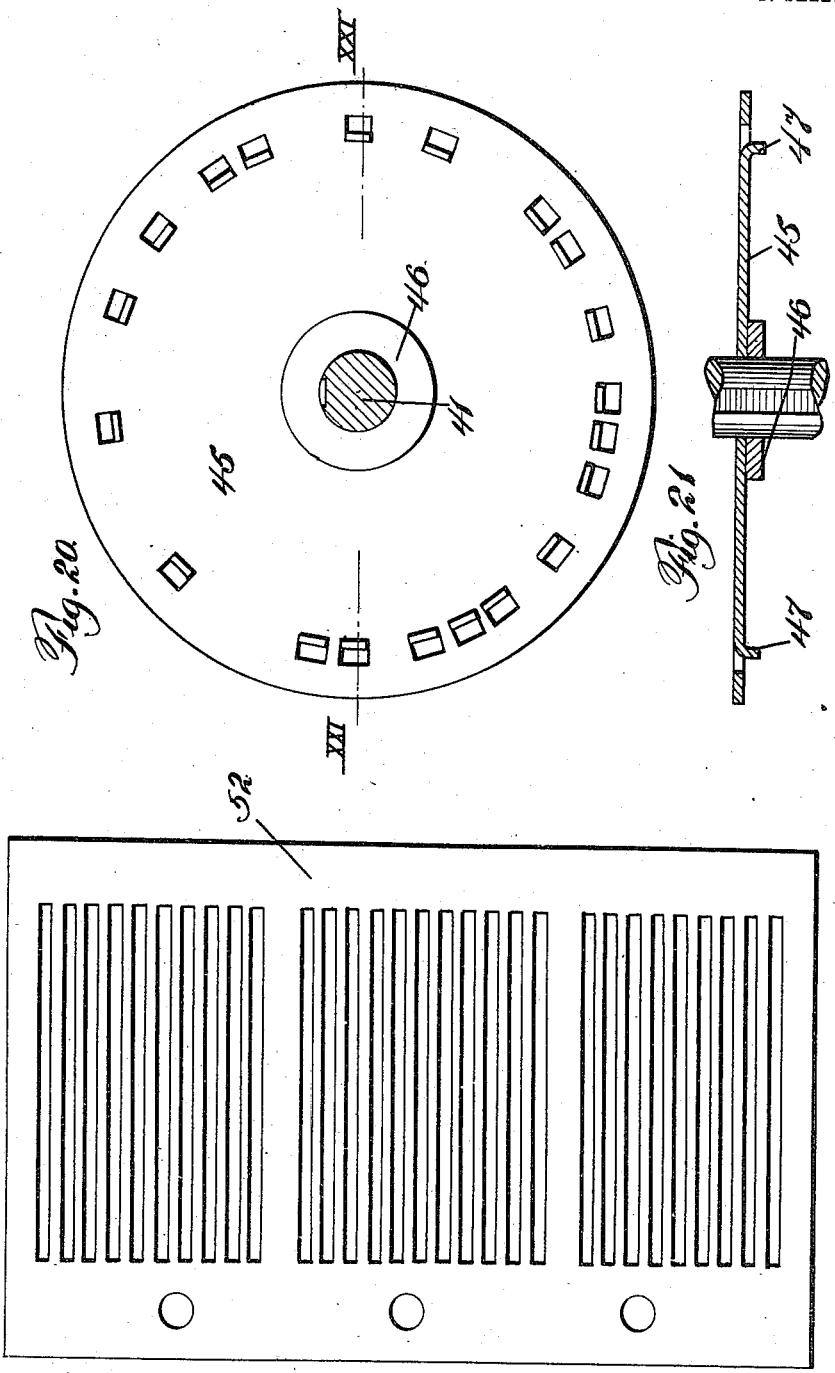

F. C. NEWELL.
MUTOGRAPH.
APPLICATION FILED NOV. 16, 1907.

976,093.

Patented Nov. 15, 1910.
17 SHEETS—SHEET 14.

WITNESSES
Harvey L. Lechner
J. C. Bradley

INVENTOR
F. C. Newell
by atty
Paul Synnestvedt

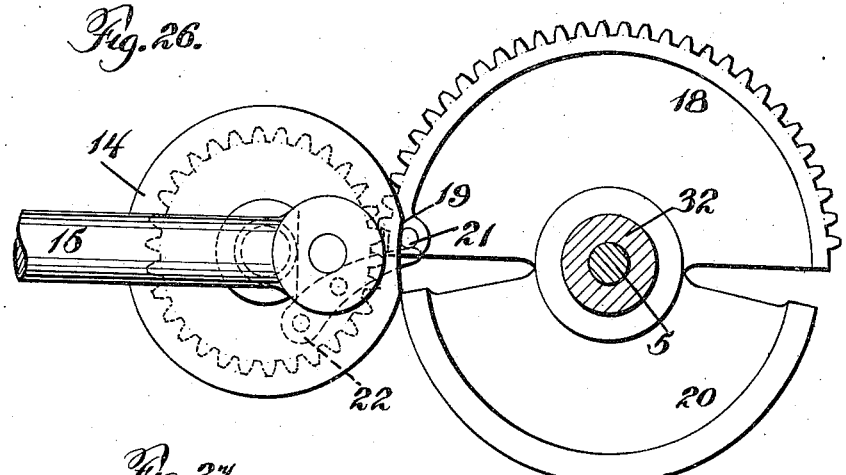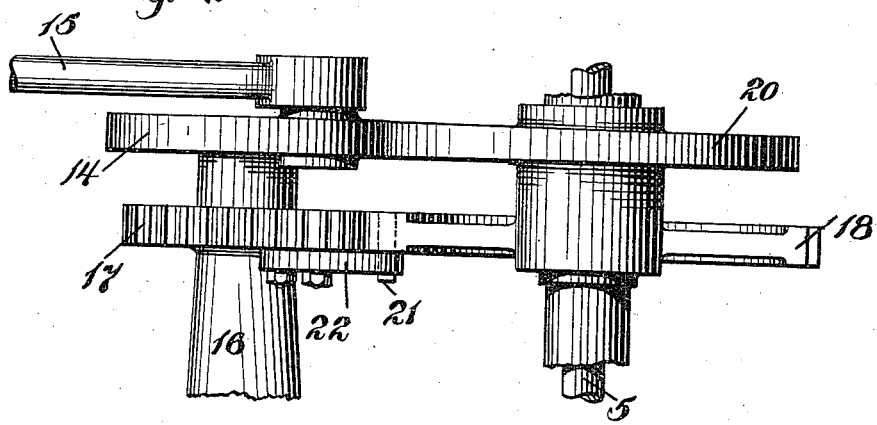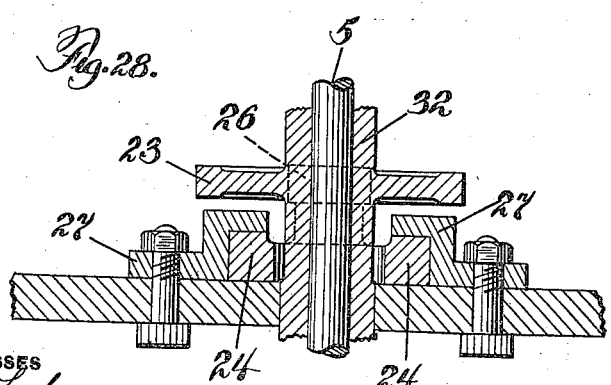

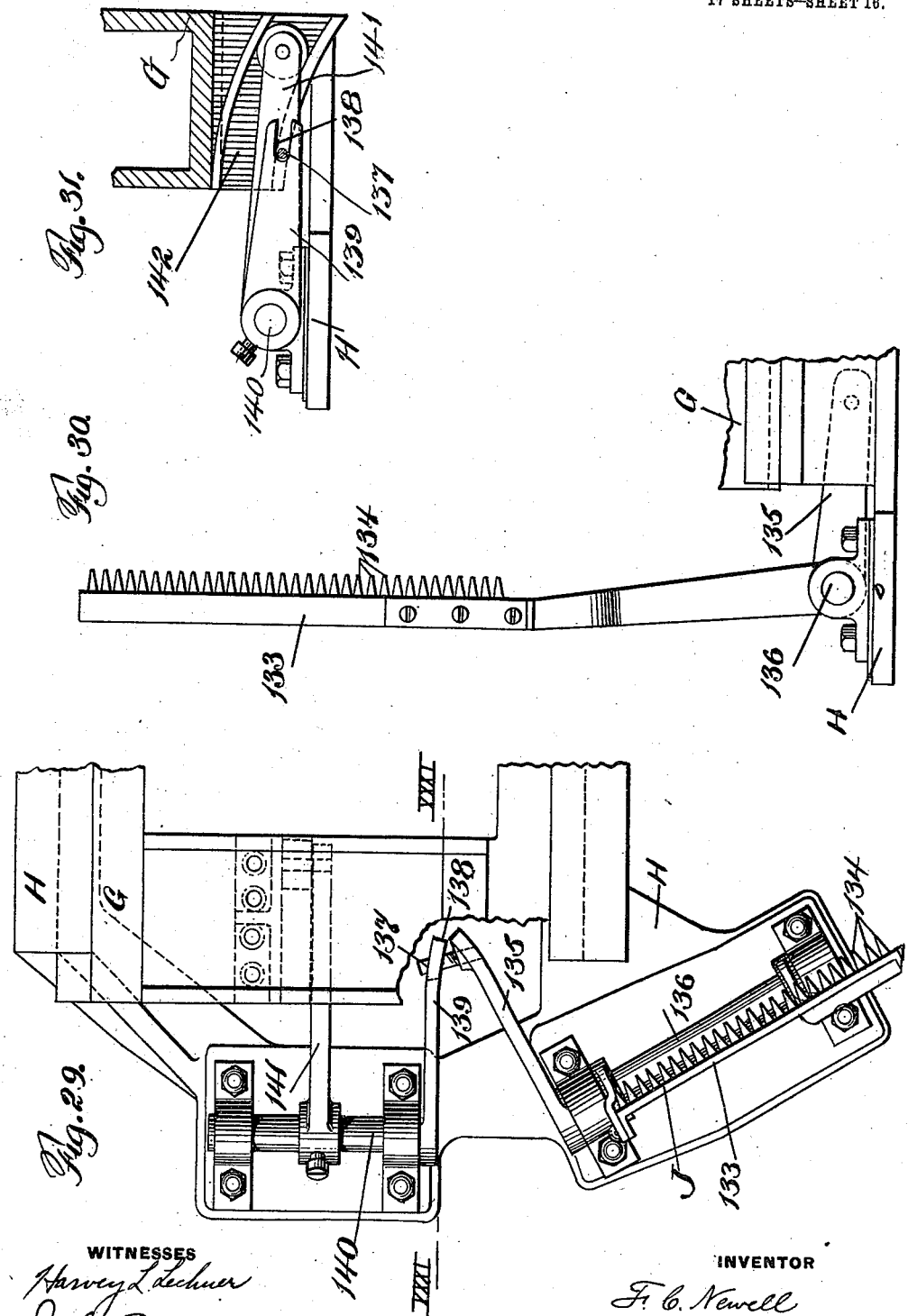

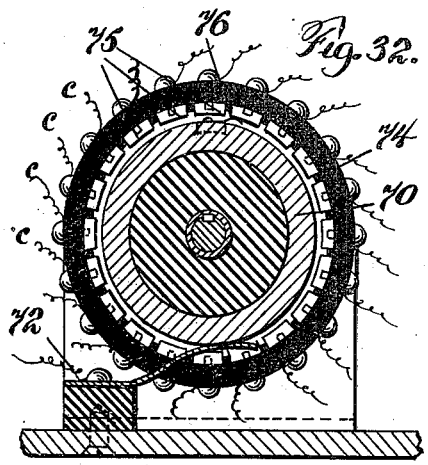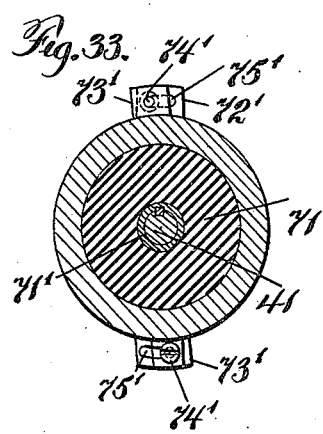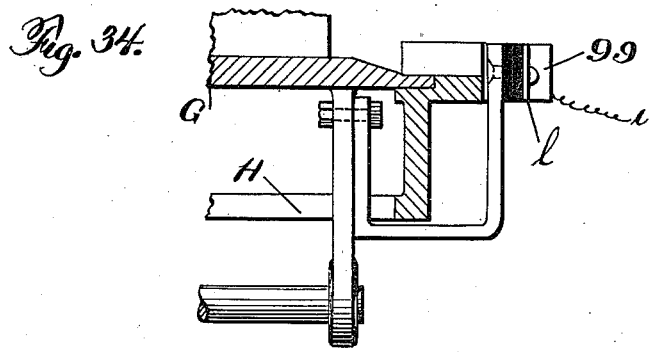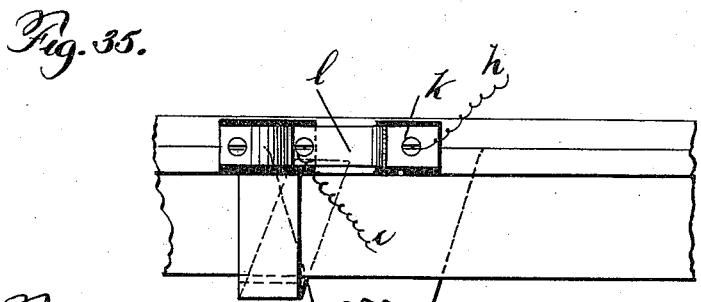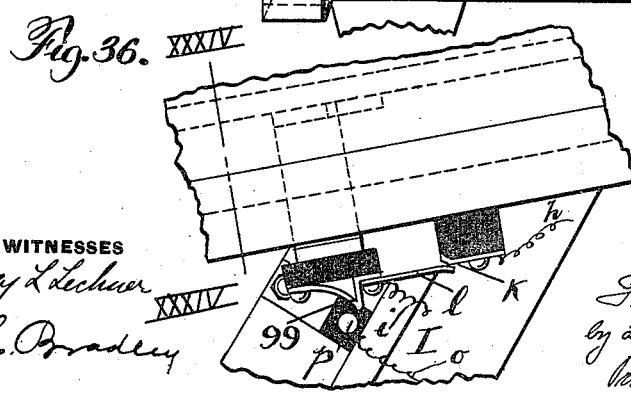

UNITED STATES PATENT OFFICE.

FRANK C. NEWELL, OF CLEVELAND, OHIO, ASSIGNOR TO THE F. C. NEWELL MUTO-GRAPH CORPORATION, OF CLEVELAND, OHIO, A CORPORATION OF OHIO.

MUTOGRAPH.

976,093.  Specification of Letters Patent.  Patented Nov. 15, 1910.

Application filed November 16, 1907. Serial No. 402,475.

*To all whom it may concern:*

Be it known that I, FRANK C. NEWELL, a citizen of the United States, residing at Cleveland, in the county of Cuyahoga and State of Ohio, have invented certain new and useful Improvements in Mutographs, of which the following is a specification.

The invention relates to display apparatus of the general type shown in my Patent No. 891,949 of June 30th, 1908, wherein a mosaic plate is utilized to impress symbols upon a moving band. The invention has for some of its principal objects; the provision of a machine having improved and simplified selector operating and controlling means, and one which may be operated by a keyboard removed at any desired distance from the symbol forming mechanism; the provision at the keyboard of means for registering in replication the sign produced on the band; the provision of a mosaic plate having an improved system of division lines whereby the danger of improperly actuating the stipples of the stipple member with which the mosaic is ordinarily intended to be used, is avoided; and in general the provision of a machine wherein the parts operate with greater rapidity and positiveness than has been the case in mutograph machines as heretofore constructed. One embodiment of the invention is illustrated in the accompanying drawings, wherein:—

Figure 1:
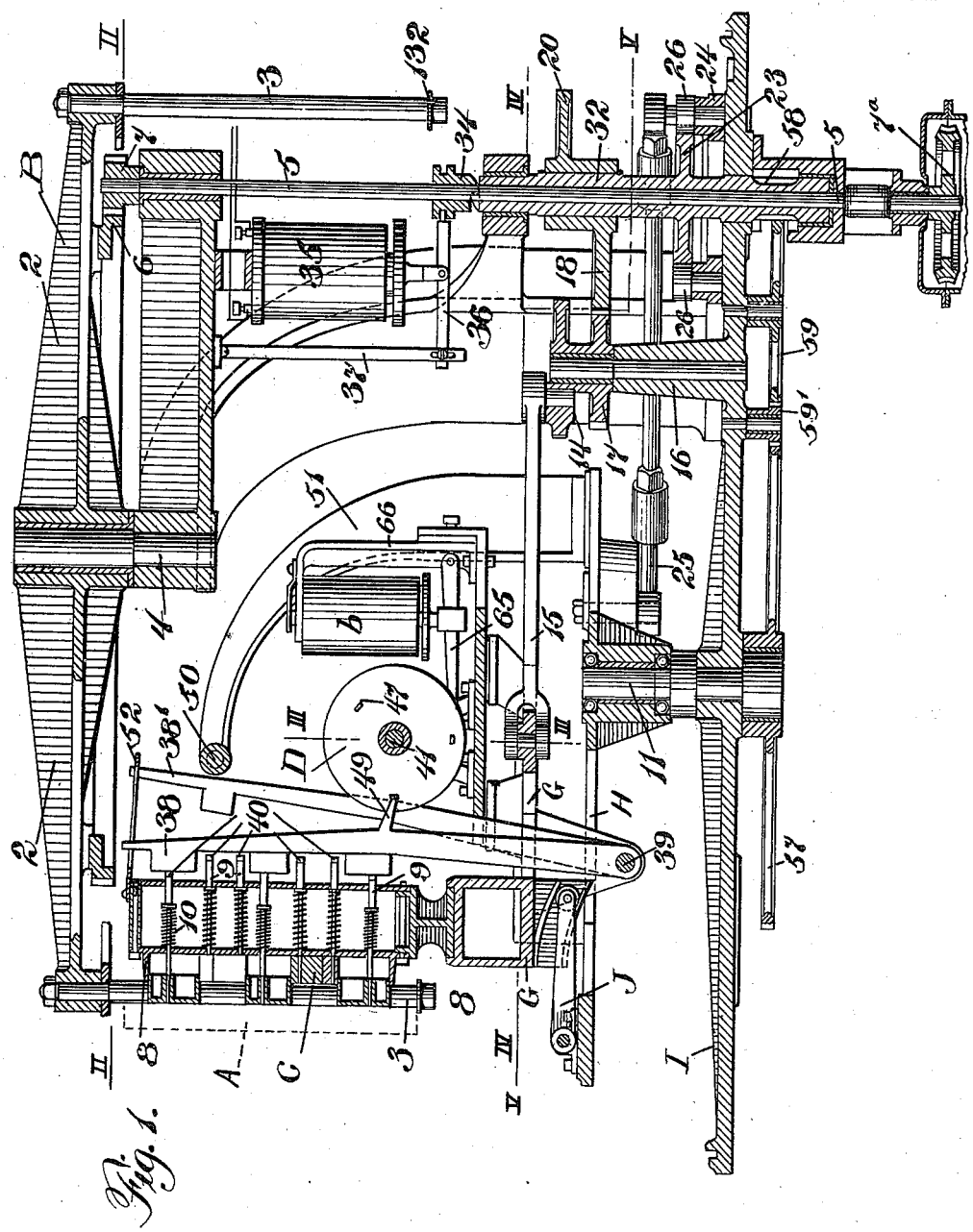
Figure 2:
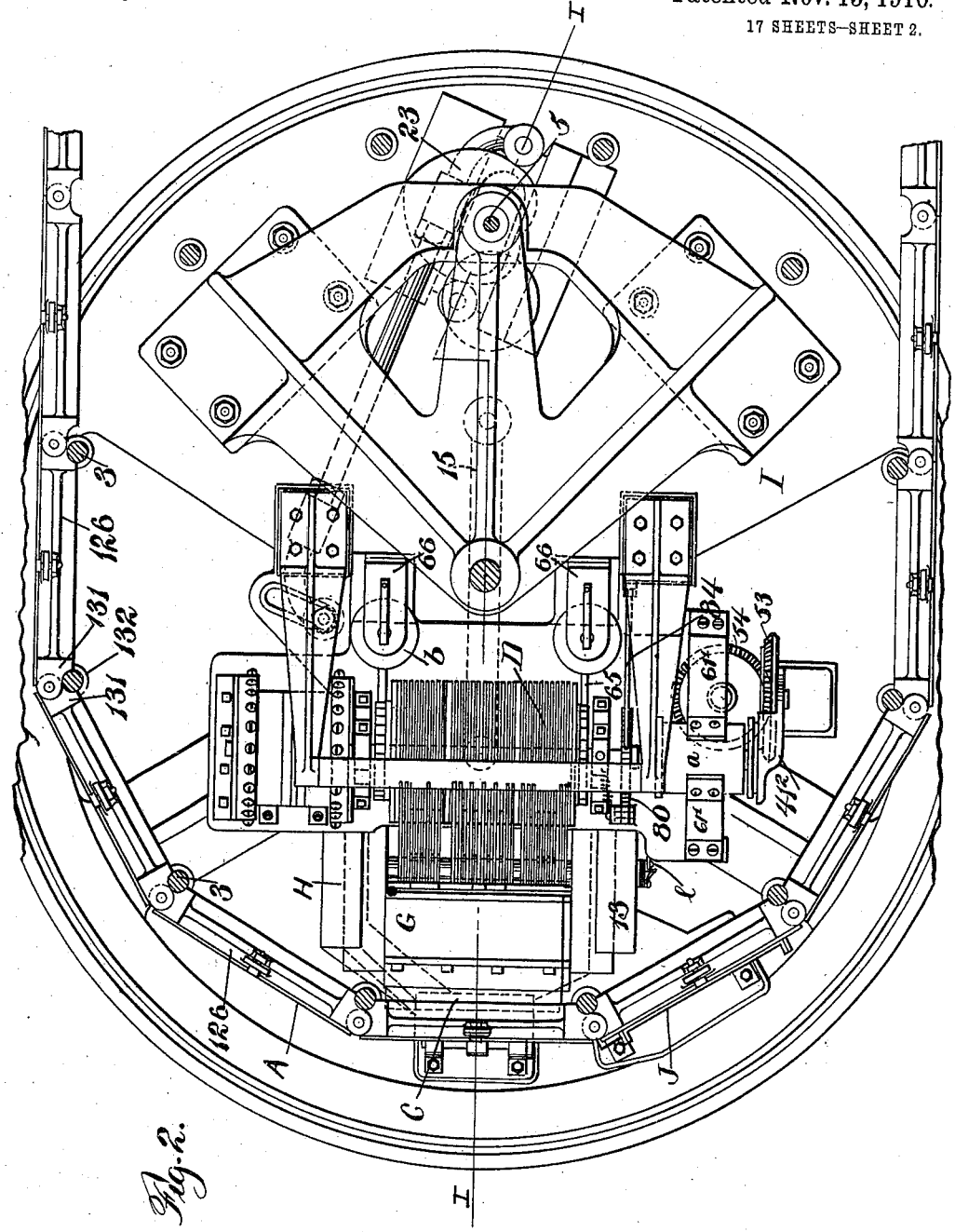
Figure 3:
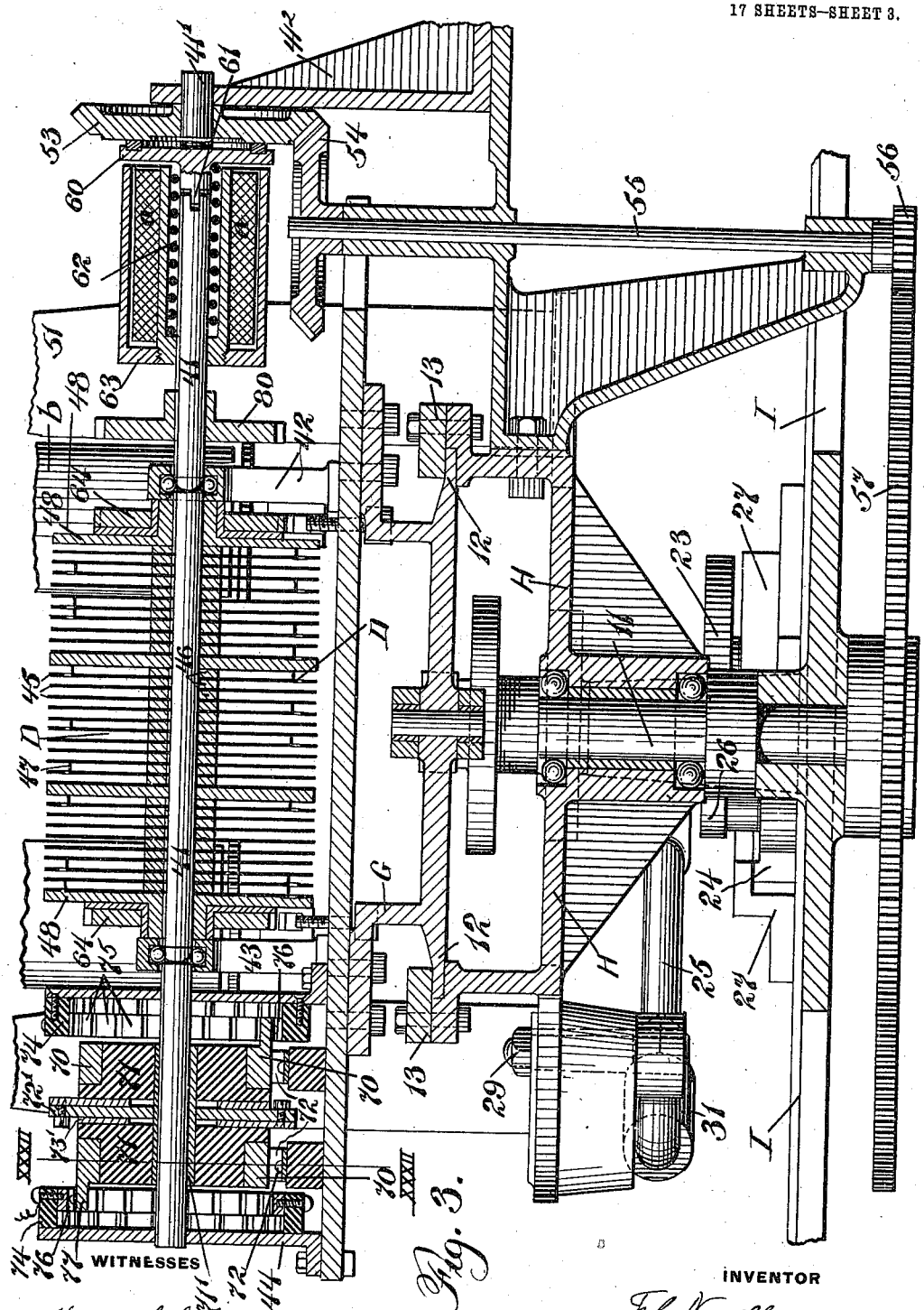

Figure 1 is a longitudinal section through the device on the line I—I of Figure 2, Figure 2 is a tranverse section on the line II—II of Figure 1, Figure 3 is an enlarged partial section on the line III—III of Figure 1, the frame carrying the selector being in its rearward position a number of the parts to the rear of the section not being shown, Figure 4 is an enlarged section on the line IV—IV of Figure 1, the frame carrying the selector being in its rearward position, Figure 5 is an enlarged transverse section on the line V—V of Figure 1, the frame carrying the selector being in its rearward position, Figure 6 is a longitudinal section through the keyboard employed on the line VI—VI of Figure 8, the release magnet being shown in section in order to more clearly disclose its construction, Figure 7 is a detail sectional view showing the position to which certain of the parts are brought by the operation of a key, Figure 8 is a plan view of the keyboard, Figure 8ª is a detail section on the line VIIIª of Figure 8, Figure 9 is a front elevation of the keyboard with the inking roller removed, Figure 10 is a transverse section through the tape guard on the line X—X of Figure 9, Figure 11 is a detail side elevation of the ratchet mechanism for feeding the tape across the keyboard, Figure 12 is a wiring diagram indicating the connections between the keyboard and the main portion of the machine, Figure 13 is a face view of the exhibiting band with certain of the symbols in relief thereon, a part of the casing of the band being broken away to more clearly illustrate the construction of the carrying links.

Figure 24:
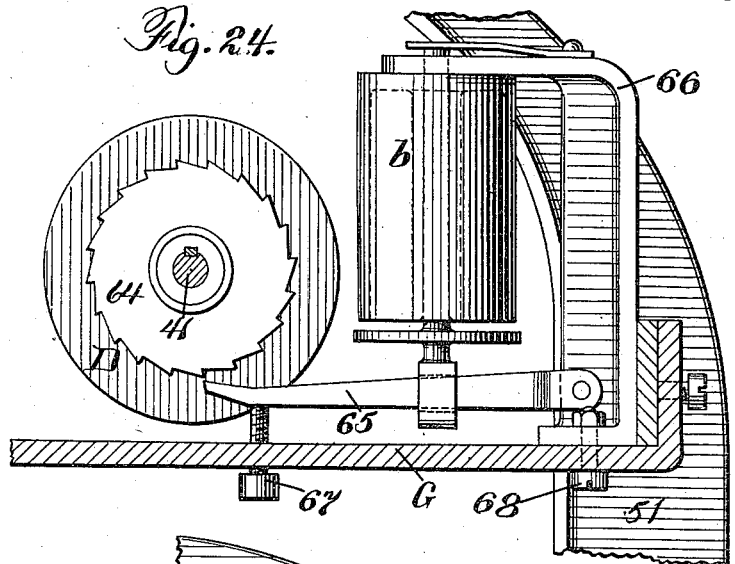
Figure 25:
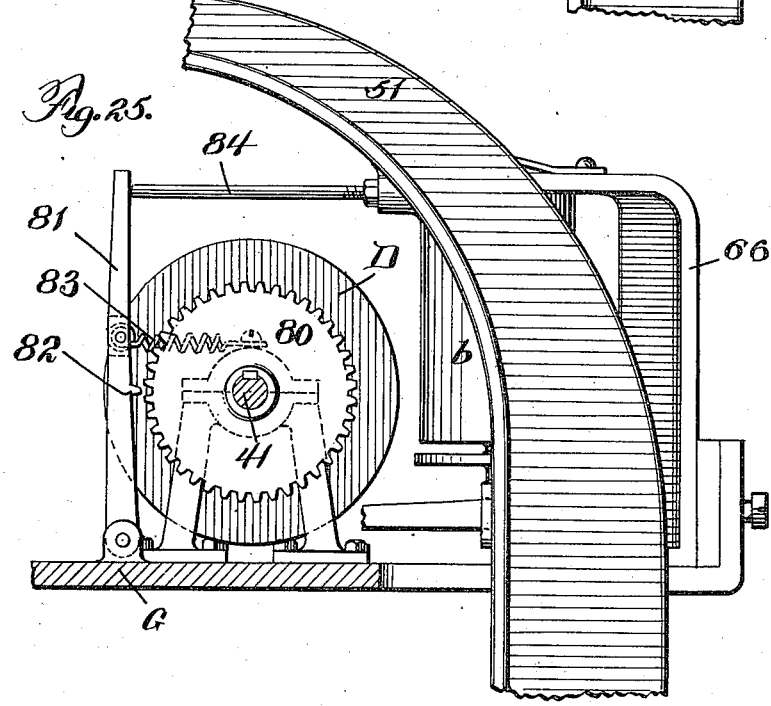

Figure 14 is a section through the band on the line XIV—XIV of Figure 13,

Figure 15 is a diagrammatic plan view showing the arrangement of the sprockets for the band, and the band in position thereon, Figure 16 is a transverse section on the line XVI—XVI of Figure 15, Figure 17 is a front elevation of the mosaic plate, the relation of the rear ends of certain of the stipples thereto being indicated diagrammatically in the upper left hand corner of the figure, Figure 18 is a purely diagrammatic view of the face of the mosaic plate, and indicates the arrangement of the actuating bars for operating the various sets of sections to produce the symbols, Figure 19 is a detail section showing the operating pin for one of the sections of the mosaic plate, and the spring for normally holding such section in retracted position, Figure 20 is a side elevation of one of the plates employed in the selector, Figure 21 is a transverse section on the line XXI—XXI of Figure 20, Figure 22 is a plan view of the comb for engaging and guiding the upper ends of the actuating bars, Figure 23 is an end elevation of the comb, Figure 24 is a detail side elevation of the means for arresting the selector in any desired position, Figure 25 is a detail side elevation of the rectifying means for bringing the selector to exact position, Figures 26 and 27 are detail plan and side elevation views respectively of the mechanism for reciprocating the frame carrying the selector, Figure 28 is a detail section through the slide and its guide on the line XXVIII—XXVIII of Figure 5, Figure 29 is a detail plan view of the stipple retractor and its operating mechanism, Figure 30 is a side elevation of the stipple retractor and its operating mechanism, Figure 31 is a section on the line XXXI—XXXI of Figure 29, Figure 32 is a detail section through the commutator on the line XXXII—XXXII of Figure 3, Figure 33 is a section through the commutator and shows an end elevation of the adjusting means between the two halves of the commutator, and Figures 34, 35 and 36 are enlarged detail views of the contact members upon the stationary and reciprocating frames, Figure 34 being a transverse section on the line XXXIV—XXXIV of Figure 36, Figure 35 being a side elevation, and Figure 36 being a plan view.

Stated briefly, the device comprises in its preferred form an endless belt or band mechanism in which the band is adapted to be carried past a reciprocable symbol or mosaic plate, whereby a series of characters are produced on the band. The mosaic plate is composed of relatively movable sections with operating means therefor, whereby all the various symbols may be produced by a different arrangement of the sections comprising the plate. The variations in symbols are produced by means of a rotary adjustable member or selector as it will be called, which selector in its various positions is adapted to actuate different sets of sections in the mosaic plate to produce the various symbols. The selector is stopped in any one of its various positions by means of electromagnetic means, which means are controlled from a keyboard provided with sets of contacts operated by the keys. The frame-work carrying the selector and mosaic plate is oscillated back and forth in the direction of travel of the band in order that the band and impressing symbols may have the same motion when they come together, and the frame carrying the mosaic plate is also given a reciprocatory movement for producing its symbol upon the band. The band is of the type shown in my patent heretofore referred to, and is so constructed as to show on its face the symbol produced in a color contrasting to that of the body of the band. The band is made to pass the mosaic plate by means of a rotating turret constituting a part of the mechanism over which the band passes. The band travels to a position where it is exposed to view, and before its return to the machine the symbols produced are obliterated, and the band is ready for a new set of symbols when it again reaches the impressing mechanism.

As shown in assembled form in Figures 1, 2, 3, 4, 5, 6, 8, 9 and 15, the principal parts of the machine are the endless display belt A (Figures 1, 2 and 15), the supporting and operating turret B at one end thereof, which acts as a drive sprocket, the mosaic plate C made up of a plurality of movable sections from which all the symbols are to be formed in relief, and adapted to be moved against a belt, the selector D which controls the production of the various symbols upon the mosaic, which selector is controlled and stopped in its various positions by means of electromagnetic means, the keyboard E (Figures 6, 8 and 9) which controls the electromagnetic means for stopping the selector in any desired position, the printing mechanism F which registers the symbols printed by the operation of the keys of the keyboard, and shows at the keyboard, a replication of the sign being produced upon the display band A, the carrier frame G which carries the mosaic plate which is moved back and forth to impress the symbol upon the display band, the supporting frame H for the carrier frame and selector which is adapted to be given an oscillatory motion in the direction of travel of the band when it engages the band to give its impression, the main supporting frame I for the device, upon which all the other mechanism is supported, and the device J for retracting the stipples.

Referrings first to Figures 1, 2 and 15, which illustrate the means for operating the endless band A, it will be seen that one of the sprockets for such band, is the turret B from which the band is driven, and that at the other end the band passes around an idler sprocket 1$^a$ of corresponding shape. The turret B consists of a spider frame having in the present instance 12 arms 2, each provided with a depending rod 3 adapted to engage and support the ends of the links constituting the endless band, (Figure 2). The turret is pivotally supported at its center upon the shaft 4, and is driven from the main drive shaft 5 of the machine by means of the gear 6 secured to the turret and meshing with the pinion 7 on the upper end of the shaft 5. This shaft 5 is provided at its lower end with a worm gear 7$^a$ which is driven from a continuously operating motor (not shown). The construction of the endless band A which engages the turret B will be described in detail hereinafter.

The mosaic plate employed for impressing the symbols upon the stipple band is of the general type illustrated in my patent referred to, and is shown in Figures 1, 17, 18 and 19. From these views it will be seen that the face of the plate is divided into a plurality of sections reciprocably mounted in a frame 8, and each section is supported by a pin 9, provided with a spring 10 normally tending to force the section to its rearmost position. By allowing certain of these pins to be operated by the springs to force them back, the other sections may be allowed to stand out in relief, forming the desired symbols. In Figure 1 a part of the sections are shown as held in a different plane from the remainder of the sections thereby forming a symbol in relief upon the face of the plate. As illustrated in Figure 17, the plate is divided into about sixty sections by which all of the letters and numerals up to 9 may be produced in block style. The manner in which the various combinations of sections may be arranged to secure the various symbols, may be determined by an inspection of Figure 17, without a detail description as to which blocks must be actuated in order to produce all the various symbols. The mosaic plate shown in Figure 17 differs principally from that of my patent application referred to, in that the inclined dividing lines between the various sections are stepped, the purpose being to remove as far as possible the inclined dividing line from the rear ends of the stipples to be engaged, and so insure the proper engagement of the sections with the stipples, even though the plates be moved laterally slightly by the vibration of the machine. This is clearly illustrated diagrammatically in the upper left hand corner of the figure wherein the rear ends of the stipples are represented by the small circles, and the dotted line $x-x$ indicates the line of division between the sections as constructed in the old form of device. It will be seen that the distance from the dividing line to the rear ends of the nearest stipples is increased by the stepped arrangement.

In order that the mosaic plate may impress its symbol upon the band A, two motions must necessarily be imparted to it, first, a movement of reciprocation to bring the plate against the band, and second, an oscillatory movement in order that the plate may move in the direction of travel of the band, whereby the travel of the band need not be interrupted during the impressing. To secure these two motions, the carrier plate or frame G upon which the mosaic plate is seated, is mounted for sliding reciprocatory movement, and this reciprocatory frame G is in turn mounted upon an oscillatory frame H mounted upon the vertical pin 11. Referring first to the construction of the slide frame G and the means for operating it as shown in Figures 1, 3, 4, 5, 26 and 27, it will be seen that the frame G has at its base (Figure 3) two laterally projecting flanges 12 fitting between a pair of two-part guide members 13, whereby the frame is guided transversely upon the top of the oscillatory frame H. The frame G is reciprocated by means of the crank disk 14 at the rear of the machine, which crank disk is connected with the frame G by means of the connecting rod 15. The crank disk is mounted upon the pillar 16 and has integral with its lower portion a pinion 17, which pinion 17 engages a segmental gear 18 mounted upon the shaft 5. The number of teeth upon the pinion 17 is the same as upon the segmental gear 18, so that one complete revolution of the shaft carrying the segmental gear 18 gives the crank disk 14 a complete revolution, and advances and retracts the sliding frame G carrying the mosaic plate. The parts are so arranged that this movement of advance and retraction takes place during that half of the oscillation of the main frame H in which the mosaic plate is following the movement of the band, and impressing its symbol thereon, which movement may be termed the forward movement of the oscillatory frame H. During the other half of the oscillation of the frame H, or return movement, during which the mosaic is returning to its starting point, there is no reciprocatory movement of the frame G as the segmental gear 18 is out of mesh with the pinion 17, and it is during this return movement that the setting of the selector hereinafter to be described, takes place. In order that the crank disk 14 be held securely in position when the segmental gear 18 is out of mesh with the gear 17, the recess 19 (Fig. 26) is provided in the periphery of the crank disk, and this recess 19 is engaged by a segmental disk 20 mounted above the segmental gear 18 and integral with the hub of such segmental gear. It will be seen that as the gears 18 and 17 disengage, the segmental disk 20 engages the recess 19, and the disk 14 is positively prevented from any movement until the parts 20 and 19 are disengaged. In order that the teeth of the two gears may properly mesh when they come together, the pin 21 is provided on the gear 18 in a position to take against the member 22 secured to the underside of the gear 17. This arrangement takes the strain off the end teeth of the segmental gear and insures a noiseless engagement. The oscillatory frame H which carries the sliding frame G just described, is pivoted upon the vertical pin 11, which is secured in the main frame I, and the antifriction bearing shown (Figure 3) is provided. An oscillation of this frame about its pivot pin 11 is secured by means of the camming arrangement shown in Figures 1, 5 and 28. The heart-shaped cam 23 is mounted to rotate with the drive shaft 5, and this cam 23 drives the slide 24, which in turn is connected to the frame G by means of the connecting rod 25. The driving connection between the slide 24 and heart-cam 23 is made by means of the upstanding rollers 26 placed at opposite sides of the heart cam. The slide 24 reciprocates in the supporting guides 27. In order that the oscillation of the frame H may be accurately adjusted after the machine is set up, two adjustable connections for the connecting rod 25 are provided, the first comprising the slot 28 in the frame H, which slot receives the bolt 29 secured to the end of the connecting rod 25, and the second comprising the coupling sleeve 30 which connects the screw threaded sections of the connecting rod, and is locked in adjusted position by means of the lock-nut 31. It is sometimes desirable to continue the operation of the turret B without giving the frames carrying the mosaic their two movements and in order to secure a disengagement of the operating parts for giving the frames their two movements, the segmental gear 18 and the heart cam 23 are keyed upon the sleeve 32 which in turn is loosely mounted upon the shaft 5. The sleeve is connected to the shaft 5 by means of the sliding clutch 34 which is feathered to the shaft 5. The clutch 34 is controlled by means of the electromagnet 35, whose armature is connected with a lever 36 engaging the clutch at its outer end and pivotally supported from the post 37 at its inner end.

The means for controlling the desired symbol upon the mosaic will now be more particularly set forth. This controlling means comprises primarily two mechanisms, namely, the actuating bars 38, 38', etc., and the rotary selector D. The bars are all pivoted to the cross rod 39 on the frame G and engage the cross members 40 (Figures 1, 18 and 19) mounted on the rear ends of the pins 9, while the selector D is rotarily mounted on the shaft 41 carried by the bearing posts 42, 43 and 44, and engages the rear of the bars 38, 38' etc., in such a way that at its various points of its rotary adjustment it will allow different combinations of bars under the influence of the springs 10 to be pressed back. As indicated in Figures 3, 20 and 21, the selector consists of a plurality of sheet metal disks 45 separated from each other by means of central spacing members 46, and having tongues 47 pressed out at intervals adjacent their peripheries. Each of these members is keyed to the shaft 41 and all of the disks are held together by means of the end members 48 engaging the bearings 42 and 43. The spaces between the tongues 47 constitute notches into which the projecting tongues 49, with which the backs of each of the levers 38, 38' etc., are provided, may be received. Extending transversely above the top of the selector (Figure 1) is a bar 50 in position to engage the rear sides of the bars 38, 38' etc., and when the frame G carrying the selector is in its rearmost position and the selector is being set, all of these bars bear against this rod, and the projections 49 on the backs of such bars are forward such a distance that they will engage with none of the tongues 47 on the selector plates. The selector is therefore free and may be rotated to set it in any desired position. On the forward movement of the frame G and the selector carried thereby, however, those of the bars 38, 38' etc., whose projections 49 are not in position to engage any of the tongues 47, will pass between the tongues 47, thus allowing the sections of the mosaic controlled thereby to remain in their rearward positions, while the other of the bars 38, 38' etc., whose projections do engage the tongues 47, will move the sections of the mosaic controlled thereby, forward, and the desired symbol in relief will be produced upon the face of the plate. The bar 50 is supported at its ends by means of the posts 51 secured to the oscillatory frame H. The upper ends of the bars 38, 38' etc., are guided and steadied in their movement by means of a comb 52 secured to the top of the frame carrying the mosaic plate, which comb is shown in detail in Figures 22 and 23. In Figure 1 the frame G is shown in advance position with a symbol in relief upon the face of the mosaic plate. The bars 38, 38' etc., and the tongues 47 on the selector are so arranged that all but one of the different rotative positions of the selector secure the production of a different symbol upon the mosaic plate. For the one position of the selector at which no symbol is to be produced, the tongues 47 are so arranged that, on the advance of the selector, none of the projections 49 at the backs of the levers engage said tongues 47, and as a result none of the sections of the selector are advanced, so that as a result a blank is secured upon the face of the selector. This position of the selector is termed the space position as it is the position occupied when a blank space is desired on the band.

The construction of the mosaic plate necessitates a very compact arrangement of operating mechanism, and this mechanism which is substantially the same as that shown in my patent heretofore referred to, is illustrated in Figure 18, which is a diagrammatic view of the sections of the mosaic, including the cross pieces 40 secured to the ends of the pins 9, and the actuating bars 38, 38' etc. The actuating bars are adapted to engage the cross pieces 40 at portions of their length, and are notched to clear such cross pieces at the other portions of their length. For the purpose of illustration, those portions of the actuating bars which engage the cross pieces are shown in section, and the notches in such bars in dotted lines. By the use of the cross pieces 40, a single bar, as 38, may be made to operate a section of the mosaic not in line with it, and a section may be operated by any one of a number of bars. By cutting the notches in the actuating bars, it is possible to actuate a section at the top of the mosaic without operating a lower one, and to operate two sections in line vertically without operating intermediate sections. Figure 19, which is a sectional view, shows the manner in which these various bars engage the cross pieces 40, while certain of the other bars pass such bar without engaging it by reason of the notches. As illustrative of the mode of operation, it may be stated that, the bars marked $x$ in Figure 18, have their projections 49 engaging the tongues 47 on the selector whereby such bars and the sections supported thereby by means of the pins 9 are held forward, while all the other sections drop back leaving the first sections in relief to form the figure 5.

One of the important departures of the present device from that of the structure of my patent referred to is the manner in which the selector is operated and controlled. This means includes a driving mechanism for giving the selector a movement of rotation during the return oscillation of the frame H from one extreme position to the other, together with means electro-magnetically controlled from a keyboard for throwing out the driving means for the selector and stopping the selector at a position of rotation corresponding to the key actuated. The driving means as shown most clearly in Figure 3, wherein the bevel gear 53 is shown mounted upon the shaft 41', and driven from the gear 54 carried by the shaft 55 which is in turn provided with a pinion 56 meshing with the large gear 57, mounted at the bottom of the machine. The gear 57 is driven from the main drive shaft 5 (Figure 1) by means of the pinion 58 on the sleeve 32 and the intermediate spur gears 59 and 59'. In order to secure the shaft 41 in releasable driving connection with the gear 53, the friction disk 60 is provided, which friction disk is adapted to move slightly longitudinally by virtue of the splice connection 61 of the end of the shaft 41 carrying the disk with the main portion of the shaft 41. The friction disk is normally held against the gear 53 by means of the spring 62 fitting inside the casing 63 which casing is secured to the shaft 41, and constitutes the casing of the magnet winding $a$. The friction disk member 60 constitutes the armature of the magnet and when the winding $a$ is energized, the disk is drawn out of contact with the gear 53 and against the end of the magnet casing. This operation thus accomplishes the double function of releasing the selector from its drive member 53 and at the same time braking the movement of the selector because of the engagement of the disk 60 with the end of the magnet casing, such casing being rigidly mounted upon the frame G by means of the brackets 61' shown in Figure 2. A member 41$^2$ (Figures 2 and 3) is secured to the bracket carrying the end of the shaft 41. This member has its face in line with the outer face of the disk 60, so that when the frame G moves forward to the position of Figure 2, and carries the disk 60 so that it is no longer in alinement with the gear 53, the member 41$^2$ will bear against the face of the disk 60 and hold it in position. The driving connections of the gear 57 and of the gear 6 which rotates the turret B, are such that they are rotated in the same direction and at the same speed. It follows from this that during the oscillation of the frame H about its axis 11 in the direction in which the band and turret are moving, the shaft 55 and consequently the selector are not rotated, but on the reverse or return movement of the frame H about its vertical axis, the shaft 55 and selector are rotated at double the speed at which they would be rotated if the frame were not oscillated. The gearing is so proportioned that on this reverse movement of the frame, the selector will be given a trifle over one entire rotation, so that it will pass all of the positions at which the various symbols may be produced. There is therefore, no tendency to rotate the selector during the part of the oscillation of the frame H in which this follows the band, but on its reverse movement there is such a rotation as gives opportunity for the securing of any desired symbol.

In order that the selector may be stopped at any desired position of rotation, a pair of ratchet wheels 64 are provided, one at each end of the selector, which ratchet wheels together with the selector are arrested by means of the mechanism shown in detail in Figure 24. This mechanism consists of the pawls 65 coöperating with the two ratchet wheels and operable from the electromagnets $b$, securely mounted in the frames 66 (see also Figures 1 and 2). The magnets $b$ are controlled in a manner to be hereinafter described from a keyboard so that the actuation of any key will secure the energization of one of the magnets at such a time as to cause the engagement of one of the pawls 65 with a tooth on the ratchet in order to stop the selector at its desired position. Two ratchet wheels 64 are employed instead of a single one with double the number of teeth in order that such teeth may be made longer to give more time for the movement of the pawls 65, it being understood that each tooth corresponds to a position of the selector at which a symbol is secured, and that the points of the teeth on one of the ratchet wheels 64 come opposite points midway between the points of the teeth on the other ratchet wheel. The movement of the pawls 65 is made adjustable by means of the set screws 67, and the frames 66 carrying the magnets $b$ are held in position by means of the bolts 68 extending through the frame G upon which the frame 66 rests. The commutator whereby the magnets $b$ may be energized at a plurality of different times, and in accordance with the various positions of the selector, is shown at the left of Figure 3 upon the shaft 41, and in detail in Figures 32 and 33. As here shown the commutator comprises a pair of continuous contact rings 70, mounted upon the insulating blocks 71 to turn with the shaft 41, a pair of brushes 72 contacting with the two rings, a pair of coöperating insulating rings 74 having secured about their interior a series of separated contact blocks 75, and two contact brushes 76, one on each contact ring 70 adapted to rub over the various contact blocks 75, as the contact rings rotate, the brushes 76 being mounted on portions 77 of the contact rings 70 projecting inside of the rings 74 (Figure 3). The two brushes 72 and the series of contact blocks 75 constitute the terminals of a plurality of incomplete circuits $c$, $c$, $c$, one for each of the symbols to be produced corresponding to the various positions of the selector, the magnets $b$ being also in these incomplete circuits. The completing of the circuits is controlled from the keyboard in a manner to be hereinafter described. When any one of the circuits is completed at the keyboard for forming any symbol, such circuit remains incomplete between the brush 72 and the one of the blocks 75 in such circuit until the ring 70 has reached a position where its brush 76 engages the proper block 75, at which time the circuit is completed and one of the magnets $b$ energized, thereby causing the engagement of one of the pawls 65 with one of the teeth on one of the ratchet wheels 64, which stops the selector in position to produce the desired symbol. The two rings 70 and two sets of contact members are used instead of the single large contact ring in order to make the device compact, and one set of contact devices governs the production of one half of the symbols and the other set of contact devices governs the production of the other half of the symbols, the circuits for one set of contact members passing through one of the magnets $b$ while the other circuits pass through the other magnet $b$. In order that the rings 70 and brushes 76 carried thereby, may be given a slight rotative adjustment, the blocks 71 carrying the rings are loosely mounted on the sleeve 71' secured to the shaft 41, and are adjustably secured to the plate 72' which is keyed to the sleeve. The adjustable connection is shown in Figures 3 and 33, and comprises the plates 73' secured to the blocks 71, and provided with headed screws 74' projecting through the slots 75' in the plate 72'. Each of the circuits above referred to also passes through the magnet $a$, so that when any circuit is completed, and the selector stopped, the armature 60 carrying the friction brake is retracted from the driving gear 53, and there is no further driving connection to rotate the selector until the parts are returned to normal position. The manner in which the connections are made will be apparent from the diagrammatic view of Figure 12, wherein the connections are shown and one of the keys L for producing the letter "L" indicated diagrammatically. As here shown $c$, $c$, $c$, are a series of wires running, one from each contact block 75, to each one of the contact terminals $f$ at the key-board, $d$ is the source of electricity, $g$ are the contact terminals against which are brought the terminals $f$ by the operation of the keys, and the other parts provided with reference symbols correspond to the parts already described. Starting with the source of electricity $d$, the operation when the key L is pressed is as follows: The current passes through the section of wire $e$, contact member $g$, contact member $f$, wire $c$, contact block 75 corresponding to the symbol L, brush 76, contact ring 70, brush 72, magnet $b$, magnet $a$, and wires $h$ and $i$, back to the source of electricity $d$, thus completing the circuit. The circuit for any symbol is secured in the same manner by the actuation of the desired key. As the selector is being rotated and set only while the frame H is oscillating reversely and while it is in its rear-most position, it is necessary that the electrical connections for starting the selector be complete only during such portion of the operation of the machine, and to this end the contacts $k$ and $l$ between the wires $h$ and $i$ (Figure 12) are provided. The position of these contacts is shown in Figure 4 and the details thereof in Figures 34, 35 and 36. The wire $h$ from the magnets $a$ is connected to the contact member $k$, carried by the frame H and this contact member contacts with the contact member $l$ when the frame G carrying the contact $l$ is in its rear position, but this contact is broken when the reciprocatory frame moves forward to impress the symbol upon the band, and the parts are so arranged that the contacts $k$ and $l$ touch during the reverse swing of the frame and are separated during the forward movement of the frame at which time the letter is being formed upon the band.

In order to finally and positively position the selector after it has been stopped by the ratchet wheels 64, the rectifying device, shown in detail in Figure 25, is provided. This device comprises a spur wheel 80 secured to the selector shaft 41, the pivoted bar 81 provided with a projecting tooth 82 for engaging the spaces between the teeth of the spur wheel 80, the spring 83 for normally holding the lever 81 to the rear and in engagement with one of the teeth of the spur wheel, and the stop 84 secured to the stationary frame member 51, and adapted to hold such lever 81 out of engagement with the spur wheel when the reciprocating frame G carrying the selector is in its rearmost position. The parts are in the position shown in Figure 25, when the reciprocating frame G is in its rearmost position and the oscillatory frame H is being moved through its reverse movement, during which movement the selector is set. At this time the selector has been stopped in approximately its proper position, by means of the electromagnet $b$ operating one of the pawls 65. On a forward movement of the frame G carrying the lever 81 such lever is carried away from the stop 84, and the projection 82 fits in the proper space in the spur wheel 80 and the selector is positively and accurately positioned at proper position and locked. The projecting tooth 82 continues in this locking position during the forward movement of the selector to impress the symbol upon the band and during the swing of the oscillatory frame as it follows the band, and the locking contact is only released as the reciprocatory frame G commences to recede, at which time the stop 84 again engages the lever 81 releasing the spur wheel 80 and permitting the setting mechanism to revolve the selector for the formation of another symbol.

The key board for making the proper contact for the control of the selector is shown in Figures 6 to 9 inclusive. A plurality of key levers 85 are provided each pivoted upon the cross shaft 86 and each provided with an upstanding operating block 87. Above each key is a contact member $f$ adapted to engage another contact member $g$ when the key is depressed, such contact members being the terminals respectively of the wires $c$ and $e$ (Figure 12). By this means any one of the plurality of incomplete circuits necessary for the formation of the various symbols may be completed by depressing the desired key. In order to prevent the depression of more than one key at a time, the device at the left of Figures 6 and 8 is provided. This device consists of a transverse rod 88 upon which is mounted at opposite ends a pair of plates 89, one of which is recessed at 90 as shown in Figure 6. These plates also carry the two rods 91 and 92 for engaging the beveled ends 93 of the key levers 85. The plates 89 and the rods carried thereby are normally held in the position shown in Figure 6 by means of the spring 94 which is secured to an arm 95 keyed to the shaft 88. When any one key is actuated, the plates 89 and the rods carried thereby are turned to the position shown in Figure 7 with the end of the key operated between the two rods as shown in such figure, at which time the lower rod 91 will be carried to a position at which it over lies the ends of the other keys, whereby they are prevented from actuation. In order that the key actuated need not be held down until the selector is set, a key retaining means is provided, comprising the pivoted lever 96 normally held in forward position by a spring 97 and adapted to have its catch 98 coact with the notch 90 on the plate 89 when the key is actuated and the plate rotated to the position shown in Figure 7. The lower end of the lever is secured to the core of a solenoid $m$ by means of the connecting rod 98, and this solenoid is arranged to be automatically operated when the key has been held down a predetermined time after the parts of the machine have reached such a position that a new key may be actuated without interference. In order to secure this result one terminal $n$ from the solenoid is directed to the source of power $d$ (Figure 12), while the other terminal $o$ is conducted to the contact pin $p$ (Figures 5, 12 and 36). This pin $p$ upstands from the stationary framework I of the machine and is adapted to be engaged by a projecting nose 99 on the contact member $l$ just as the reciprocatory frame G starts to move forward to impress the symbol upon the band, at which instant the contact between the terminals $k$ and $l$ is broken as heretofore described. This completes the circuit, actuating the key-release solenoid $m$ to withdraw the catch 98 from engagement with the notch 90 and permit the key to return to its normal position. By this arrangement the circuits for setting the selector are disconnected during the time the mosaic is being impressed upon the band, and the release of the key and its return to its normal position notifies the operator that another key may be pressed down for securing the next letter. This is desirable as the key board is often removed a considerable distance from the machine which it controls.

As heretofore mentioned, the selector has one position at which none of the sections of the mosaic are advanced, and such a position is termed the space position, as when the selector is in this position no impression is produced on the stipple band. It is desirable that the selector come to this space position when none of the keys controlling the symbols are actuated, and to this end the space position on the selector is provided with a terminal block 75, and incomplete connections to the key board similar to those for controlling the production of symbols, and automatic means are provided at the key board for completing this circuit whenever there is a failure to operate one of the symbol keys. This means comprises the insulating block 101 (Figures 8 and 8ᵃ) secured to the shaft 88 and provided with a transverse contact strip 102 and the pair of brushes 103 contacting with the opposite ends of the strip, which brushes constitute the terminals of the circuit for bringing the selector to space position, the circuit wires being lettered *q* and *r* on the diagram of Figure 12. When none of the symbol keys are actuated and the parts are in the position shown in Figure 6, the contact brushes 103 bear against the opposite ends of the strip 102 and the selector is stopped at the space position. When however, a symbol key is actuated the member 101 carrying the contact strip 102 is rotated so that the strip 102 occupies the position shown in dotted lines in Figure 8ᵃ, and the circuit for the space position is broken. It will be seen that whenever a symbol key is not operated the selector is made to stop automatically at the space position. A space key is also provided (Figure 12), which key is provided with a lever and operates in precisely the same manner as the symbol keys with the exception that the contacts *f' g'* close the space circuit instead of a symbol circuit. As before indicated the selector will be automatically stopped at the space position when no symbol key is operated, and the purpose of the space key is simply to enable the operator to keep step with the operation of the machine when the symbol keys are not being operated. This is possible as the space key returns to its position at a certain period in the operation of the machine and the return of the key to its normal position informs the operator that a space has been made and that another key may be operated.

Associated with the keyboard is a printing mechanism whereby a printed impression is made whenever a letter is struck, to the end that a record of the symbols made by the machine be secured, and a replication of the symbols produced on the band be reproduced before the operator. This mechanism is shown and claimed in my co-pending application, Serial No. 402,477, and comprises in its essentials, a keyboard, a printing wheel with characters on its circumference corresponding to those on the keyboard, a band or tape and a yieldingly rotated shaft for turning the printing wheel provided with a stop for each key, so arranged that each key when pressed down engages with a stop to arrest the rotating shaft and printing wheel in position to print upon the band the letter of the key actuated. Each of the key levers 85 is provided on its lower side with a stop shoulder 104, and beneath these stop shoulders 104, and transverse of the machine is the stop shaft 105, which stop shaft is provided with a cylinder 106, carrying a plurality of stop pins 107. The stop pins are in position to be engaged by the shoulders 104 on the key levers 85, and each pin occupies a different rotative position upon the cylinder carrying the pins, the parts being so arranged that the engagement of the shoulder of a key with a stop pin will arrest the rotation of the stop shaft in a different rotative position from that occupied when any other key is actuated. The end of the shaft 105 carries the spur gear 108, which engages another spur gear 109 mounted between the standards 110. Mounted so as to rotate with the spur gear 109 is the printing wheel 111, which printing wheel is provided on its circumference with a series of characters corresponding to those upon the keyboard. The shaft 105 is continuously driven from a motor 112 by means of a belt 113, which belt is so applied that when the shaft 105 is positively stopped, the belt will slip until the shaft is released. A receiving tape 114 is made to pass one portion of the circumference of the wheel, and the stops 107 are so arranged with reference to the characters upon the circumference of the printing wheel 111 that the stoppage of the shaft 105 by the actuation of any key lever will stop the printing wheel with the character of the key actuated in position to be impressed upon the tape 114. The means for pressing the tape against the printing wheel will be seen from Figure 6. This means comprises the vertical lever 115 having its upper end in position to press the band against the printing wheel, and connected at its lower end to the lever 96 by means of the connecting rod 116, the parts being so adjusted that when the upper end of the lever 96 moves rearward out of engagement with the notch 90, the upper end of the lever 115 is moved forward to press the tape against the printing wheel. A step-by-step feeding of the tape 114 is accomplished by means of the pinch rollers 117 and 118, which engage the tape after it has passed across the top of the keyboard. The top of the roller 118 is provided with ratchet teeth and these ratchet teeth are engaged by the pawl 119 carried by the upper end of the rocking lever 120, which lever 120 is mounted upon the shaft 121 extending across the machine and carrying at its other end the lever 115. A slight movement of rotation is thus communicated to the shaft 121 as the upper end of the printing lever 115 moves to its rearward position after each actuation, and this movement of rotation acting through the lever 120 and pawl 119 gives the tape a step-by-step movement across the printing wheel. The tape is supported in its traverse across the face of the keyboard by the clip or guide 122, shown in Figure 9 and in cross section in Figure 10. This clip is open at its back at a point opposite the printing wheel in order that the face of the printing lever 115, may engage the tape, but at other points is solid and serves to guide and support the tape. The parts are so proportioned and arranged that the printing which appears before the operator upon the keyboard is a replication of what is shown upon the band which is exhibited at the machine both as to subject-matter and position. Tension rollers 123 and 124 are provided at the side of the machine opposite to that of the pinch rollers 117 and 118, in order that the intervening tape may be held tight. An inking roller 111' is also provided (Fig. 6).

The stipple band used is shown in enlarged detail in Figures 13 and 14. As previously indicated in connection with Figures 15 and 16, one end of the band is carried and driven by the turret B which acts as a sprocket while the other end is carried by the idler sprocket 1ª. Intermediate the sprockets, the band is inclosed by a casing 124, which casing is open at the sides as indicated to expose the stipple band and may be supported in any desired manner. The opposite sides of the casing are stiffened by means of the transverse braces 125. The band itself comprises a series of open metal sections or links 126 interlocking at the edges and secured together by means of the pivot pins 127. The edges of these members are supported and guided upon the framework 124 by means of the rollers 128. Inside of each of the sections is a stipple plate preferably of rubber composition and provided with a plurality of closely spaced holes in which are mounted the stipple pins 130 having their forward ends of a color contrasting with that of the stipple plate. The precise construction of the plates used is shown in detail in my Patent Number 909,444 of Jan. 12, 1909, to which reference may be had for a detailed description. Figure 13 of the drawing illustrates the effect produced when the stipples are pressed through the plate by symbols in relief in the mosaic plate, the symbols produced in Figure 13 being the letters F and C. The stipple plates 129 are held in position in the frames 126 by means of set screws (not shown), and the faces of such frames are painted to correspond in color with that of the stipple plates. As indicated in Figure 2 the links 126 are of the width just sufficient to extend between the downwardly extending rods 3 on the turret B, and the ends 131 of such members 126 are shaped to fit snugly around the rods 3 as the links pass around the turret, the lower sides of the links resting against the collars 132 (Figure 1) at the bottoms of the depending rods 3.

The means J by which the stipples are pressed back into the band just before they arrive at the impressing means is shown in Figures 29, 30 and 31. The means comprises a plate 133 having the fingers 134, one for each of the stipple holes in the plate. This plate 133 is mounted to oscillate on the frame H in time with the movement of the belt, and the stipples in each plate are retracted as they come opposite the plate. The oscillation of the plate 133 is accomplished by means of the lever arm 135 carried by the end of the shaft 136 upon which the plate 133 is mounted. This arm 135 carries at its end a pin 137 fitting the slot 138 in an arm 139 carried by the shaft 140, which shaft is oscillated by the rock-arm 141 engaging a groove 142 in the under side of the reciprocatory frame G (Figure 31). Each forward movement of the frame G to impress a symbol upon the band rocks the arms 141, 139 and 135 downward, thereby moving the plate 133 forward and retracting the stipples in the plate engaged, and each rearward movement of the reciprocatory frame G moves the plate with its fingers 134 out of engagement with the stipple band.

The operation of the device briefly stated, is as follows. Power being applied to the drive shaft 5, such shaft is revolved and by means of the gears 6 and 7 revolves the turret B thereby carrying the endless band A about such turret and idler sprocket 1ª. The revolution of the drive shaft also reciprocates the frame G by means of the crank disk 14, the connecting rod 15, and the gears 17 and 18, thereby carrying the frame G toward and from the band, while the gears 17 and 18 are in engagement, and permitting such frame to remain stationary in its rearmost position during the reverse movement of the oscillatory frame H upon which the reciprocatory frame G is mounted. Simultaneous with the forward movement of the sliding frame G, the frame H which carries such reciprocating plate is given an oscillatory movement in the direction of travel of the band, by means of the cam 23, the slide 24, and its connecting arm 25. After the mosaic has been pressed upon the band, and as the frame H is oscillating back to the starting position, the parts are in the position shown in Figure 4, at which time the frame G is stationary in its rear position, and it is during this reverse period that the selector D is rotated, which rotation occurs by virtue of the rotation of the shaft 41 driven by the train of gearing 53, 54, 55, 56, 57, 59, 59' and 58. The selector makes a trifle over one revolution during this reverse movement of the oscillatory frame H, thus giving an opportunity for its stoppage in any one of its rotative positions. If now one of the keys of the key board E, as for instance the key L is depressed, the contacts $f$ and $g$ are engaged (Figure 6), and the shaft 88 rotated until the retaining lever 96 engages the notch 90 to hold the key in depressed position for a certain period. The bringing together of the contacts $f$ and $g$, causes a current from the source of electricity $d$ to pass through the wire $e$ (Figure 12) the contacts $f$, $g$, the wire $c$, and the contact member 75, and when the brush 76 reaches such contact member, through the contact ring 70, the brush 72 and thence through the magnets $b$ and $a$, the wire $h$, the contact members $k$ and $l$, and the wire $i$ to the source of electricity $d$, thus completing the circuit. The energization of the winding $a$ causes the disengagement of the friction clutch 60 from the driving gear 53, thus disconnecting the drive of such shaft and the selector, and breaking the rotation of the selector because of the engagement of the disk 60 with the end of the magnet frame, and the energization of the winding $b$ causes the pawl 65 to engage the ratchet 64 thus stopping the rotation of the selector in position to secure the formation of the letter "L." During this oscillation the oscillating frame H has been moving to the extreme of its reverse movement, and the segmental gear 18 for securing the reciprocation of the frame G has arrived at the position shown in Figure 26. A further movement of the segmental gear 18 now causes the rotation of the gear 17 and the crank disk 14, thus causing the frame G to advance, which advance moves the lever 81 of the rectifying device (Figure 25) away from the stop 84 and permits the projection 82 to enter its proper tooth thereby finally positioning the selector and locking it in such position. A still further movement of the frame H forward carries the upper end of the actuating bars 38, 38', etc., away from the supporting bar 50 thus causing the bars, whose projections 49 are in position to engage the tongues 47 on the selector, to be held forward, pushing out certain of the sections on the mosaic. At this forward movement the engagement between the contacts $k$ and $l$ (Figures 12 and 36) is broken and the nose 99 of the contact member $l$ engages the contact pin $p$ for energizing the key release circuit. This key release circuit thus closed, comprises the source of electricity $d$, the wire $e$, the wire $n$, the key release magnet $m$, the wire $o$, the contact members $p$ and $l$, and the wire $i$. The completion of this circuit and the energization of the magnet $m$ causes the movement of the lever 96 from engagement with the plate 89, and permits the actuating key to return to its normal position, thus notifying the operator that another key may be actuated. The oscillatory frame G, with the mosaic now follows the movement of the stipple band until the symbol is impressed, and the reciprocatory frame G is retracted to its rearmost position, at which time the contact members $k$ and $l$ are again engaged, and the selector is again in position to be set by the actuation of another key. The final rearward movement of the frame G also carries the end of the lever 81 against the end of the stop member 84 thus releasing the projection 82 from the teeth of the spur wheel 80, so that the selector is free to be rotated to another position, such release occurring just a trifle before the frame H starts on its return movement. The further details of operation will be clear without further description from the description heretofore given of the various parts of the machine.

Having thus described my invention and illustrated its use, what I claim as new and desire to secure by Letters Patent is the following:—

1. The combination with a mosaic plate composed of relatively movable sections adapted to form a plurality of symbols in relief and a movable selector therefor whose various positions govern the symbol to be produced upon the mosaic plate, of means for moving the selector, a keyboard, stop means for arresting the movement of the selector, and connections thereto from the keyboard whereby the actuation of any key will operate the stop means and arrest the selector in position to secure upon the mosaic the symbol corresponding to that of the key actuated.

2. The combination with a mosaic plate composed of relatively movable sections adapted to form a plurality of symbols in relief and a movable selector therefor whose various positions govern the symbol to be produced upon the mosaic plate, of friction means for moving the selector, a keyboard, stop means for arresting the movement of the selector, and connections thereto from the keyboard whereby the actuation of any key will operate the stop means and arrest the selector in position to secure upon the mosaic the symbol corresponding to that of the key actuated.

3. The combination with a mosaic plate composed of relatively movable sections adapted to form a plurality of symbols in relief and a movable selector therefor whose various positions govern the symbol to be produced upon the mosaic plate, of a releasable means for moving the selector, a keyboard, stop means for arresting the movement of the selector, and connections from the keyboard to the stop means and the releasable means whereby the actuation of any key will operate to throw out the releasable means for moving the selector and throw in the stop means and arrest the selector in position to secure upon the mosaic the symbol corresponding to that of the key actuated.

4. The combination with a mosaic plate composed of relatively movable sections adapted to form a plurality of symbols in relief and a movable selector therefor whose various positions govern the symbol to be produced upon the mosaic plate, a releasable means for moving the selector, a keyboard, stop means for arresting the movement of the selector, and connections from the keyboard to the stop means and the releasable means whereby the actuation of any key will operate to throw out the releasable means for moving the selector and throw in the stop means and arrest the selector in position to secure upon the mosaic the symbol corresponding to that of the key actuated, and automatic means for releasing the stop means and reëngaging the releasable means after a predetermined interval.

5. The combination with a mosaic plate composed of relatively movable sections adapted to form a plurality of symbols in relief and a rotatable selector therefor whose various rotative positions govern the symbol to be produced upon the mosaic plate, of means for rotating the selector, a keyboard, stop means for arresting the movement of the selector, and connections thereto from the keyboard whereby the actuation of any key will operate the stop means and arrest the selector in position to secure upon the mosaic the symbol corresponding to that of the key actuated.

6. The combination with a mosaic plate composed of relatively movable sections adapted to form a plurality of symbols in relief and a rotatable selector therefor whose various rotative positions govern the symbol to be produced upon the mosaic plate, of friction means for rotating the selector, a keyboard, stop means for arresting the movement of the selector, and connections thereto from the keyboard whereby the actuation of any key will operate the stop means and arrest the selector in position to secure upon the mosaic the symbol corresponding to that of the key actuated.

7. The combination with a mosaic plate composed of relatively movable sections adapted to form a plurality of symbols in relief and a rotatable selector therefor whose various rotative positions govern the symbol to be produced upon the mosaic plate, of rotating means for the selector having clutch engagement therewith, a keyboard, stop means for arresting the rotation of the selector, and connections from the keyboard to the stop means and clutch whereby the actuation of any key will operate to throw out the clutch and throw in the stop means and arrest the selector in position to secure upon the mosaic the symbol corresponding to that of the key actuated.

8. The combination with a mosaic plate composed of relatively movable sections adapted to form a plurality of symbols in relief and a rotatable selector therefor whose various rotative positions govern the symbol to be produced upon the mosaic plate, of rotating means for the selector having friction clutch engagement therewith, a keyboard, stop means for arresting the rotation of the selector, and connections from the keyboard to the stop means and clutch whereby the actuation of any key will operate to throw out the clutch and throw in the stop means and arrest the selector in position to secure upon the mosaic the symbol corresponding to that of the key actuated.

9. The combination with a mosaic plate composed of relatively movable sections adapted to form a plurality of symbols in relief and a rotatable selector therefor whose various rotative positions govern the symbol to be produced upon the mosaic plate, of means for rotating the selector, a keyboard, stop means for arresting the rotative movement of the selector, electromagnetic operating means therefor and connections thereto from the keyboard whereby the actuation of any key will operate the electromagnetic means and cause the stop means to arrest the selector in position to secure upon the mosaic plate the symbol corresponding to that of the key actuated.

10. The combination with a mosaic plate composed of relatively movable sections adapted to form a plurality of symbols in relief and a rotatable selector therefor whose various rotative positions govern the symbol to be produced upon the mosaic plate, of means for rotating the selector, a clutch for connecting the selector to the rotating means, stop means for arresting the rotative movement of the selector, a keyboard, electromagnetic means for the clutch and stop means, and connections thereto from the keyboard whereby the actuation of any key will operate the electromagnetic means thereby throwing out the clutch and arresting the selector in position to secure upon the mosaic the symbol corresponding to that of the key adapted to form a plurality of symbols in actuated.

11. The combination with a mosaic plate composed of relatively movable sections adapted to form a plurality of symbols in relief and a rotatable selector therefor whose various rotative positions govern the symbol to be produced upon the mosaic plate, of means for rotating the selector, a keyboard, stop means for arresting the rotative movement of the selector, electromagnetic operating means therefor and connections thereto from the keyboard whereby the actuation of any key will operate the electromagnetic means and cause the stop means to arrest the selector in position to secure upon the mosaic plate the symbol corresponding to that of the key actuated and means for maintaining any key actuated in operative position a predetermined period and then permitting its return to normal position.

12. In combination in a mutograph, a supporting frame, a band for receiving impressions movable past the frame, an oscillatory member carried by the frame, a sliding member carried by the oscillatory member, and a mosaic impressing plate and controlling means therefor mounted upon the sliding member, all so arranged that the mosaic plate may be moved against the band and given a lateral motion in the direction of travel of the band.

13. The combination with a reciprocatory frame carrying a mosaic plate composed of relatively movable sections adapted to form a plurality of symbols in relief, and a rotatable selector therefor, of means for rotating the selector, a keyboard, stop means for arresting the rotative movement of the selector, electromagnetic operating means therefor, connections thereto from the keyboard whereby the actuation of any key will operate the electromagnetic means and cause the stop means to arrest the selector in position to secure upon the mosaic plate the symbol corresponding to that of the key actuated, means for engaging the key operated and holding it in operative position and electromagnetic means operated by the movement of the reciprocatory frame for causing the release of the key.

14. The combination with a reciprocatory frame carrying a mosaic plate composed of relatively movable sections adapted to form a plurality of symbols in relief, and a rotatable selector therefor, of means for rotating the selector, a keyboard, stop means for arresting the rotative movement of the selector, electromagnetic operating means therefor, connections thereto from the keyboard whereby the actuation of any key will operate the electromagnetic means and cause the stop means to arrest the selector in position to secure upon the mosaic plate the symbol corresponding to that of the key actuated, means for engaging the key operated and holding it in operative position, and means operated by the reciprocation of the frame for breaking the connections to the keyboard and for causing the release of the key.

15. In a mutograph the combination with a selector and electromagnetic means for stopping it in any one of its operative positions, of a keyboard, a circuit controlled by each key for securing the stoppage of the selector at a position corresponding to the key actuated, and printing mechanism operable by the keys for registering the keys actuated.

16. In a mutograph the combination with a selector and electromagnetic means for stopping it in any one of its operative positions, of a keyboard, a circuit controlled by each key for securing the stoppage of the selector at a position corresponding to the key actuated, and printing mechanism operable by the keys for registering the keys actuated, the record thereof being arranged in position to be observed by the operator.

17. In a mutograph the combination with a selector and electromagnetic means for stopping it in any one of its operative positions, of a plurality of circuits for controlling the position of stoppage of the selector, a keyboard comprising a plurality of keys, a pair of contacts for each circuit, each pair in position to be brought together by the operation of a key, means for holding in operative position for a predetermined period any key actuated and means for preventing the actuation of another key while the first key is in operative position.

18. In a mutograph, the combination with a selector having a plurality of operative positions and one space position, and electromagnetic means for stopping it in any one of its positions, of a keyboard, a circuit controlled by each key for securing the stoppage of the selector at its operative positions in correspondence with the keys actuated and connections for securing the positioning of the selector at its space position when none of the keys are actuated.

19. In a mutograph, the combination with a selector having a plurality of operative positions and one space position, and electromagnetic means for arresting it in any one of its positions, of a keyboard, having keys corresponding to the operative positions of the selector and a space key corresponding to the space position thereof, a circuit controlled by each key for securing the arrestment of the selector at its various positions in correspondence with the keys actuated, a catch for engaging and holding each key actuated in operative position and electromagnetically controlled means arranged to release the keys from operative position.

20. An operating keyboard for a mutograph comprising a set of pivoted key levers, a pair of contacts for each lever adapted to be engaged when the key levers are actuated, a transverse rotative shaft having means for yieldingly holding the keys in inoperative position, a catch for engaging the shaft when a key is actuated and preventing its return to normal position, and electromagnetic means for releasing the catch.

21. A mosaic plate for producing symbols upon a stipple member comprising a plurality of sections movable relatively to the body of the plate to produce a plurality of different symbols having the inclined division lines between the sections stepped, such division lines being stepped.

22. The combination with a stipple band comprising a body portion and a plurality of transversely movable stipples, of means for retracting the stipples comprising an oscillatory member provided with a plurality of fingers adapted to engage the outer faces of the stipples and press them back into the band.

23. The combination in a mutograph machine, of a stipple band, a mosaic plate adapted to form symbols in relief, means for moving it to secure the symbols upon the band, and means oscillated by the movement of the mosaic plate for retracting the stipples and comprising a member provided with a plurality of fingers adapted to engage the ends of the stipples and press them back into the band.

24. In a mutograph, a selector whose various relative positions govern the symbol to be produced, releasable means for rotating the selector, a friction brake for slowing up the selector, positive stop means for arresting the movement of the selector, a keyboard, and connections therefrom for controlling the releasable means, the friction brake and stop means whereby the actuation of any key will operate to throw out the releasable means for rotating the selector and throw in the friction brake and stop means.

25. The combination with a reciprocatory frame carrying a mosaic plate composed of relatively movable sections adapted to form a plurality of symbols in relief, and a rotatable selector therefor, of means for rotating the selector, a keyboard provided with movable keys having operative and inoperative positions, stop means for arresting the rotative movement of the selector, electromagnetic operating means for the stop means, connections thereto from the keyboard whereby the actuation of any key will operate the electromagnetic means and cause the stop means to arrest the selector in position to secure upon the mosaic plate the symbol corresponding to that of the key actuated, means for engaging the key operated and holding it in operative position, a contact operated by the movement of the reciprocatory frame for breaking the connections from the keyboard to the electromagnetic operating means, and electromagnetic means operated by the movement of the reciprocatory frame for causing the release of the key when the said connections from the keyboard to the electromagnetic operating means are broken.

26. Operating means for a mutograph comprising an oscillatory frame, a sliding frame, a selector mounted thereon, a pinion provided with a crank connection to the sliding frame for reciprocating it, an operating shaft and a segmental gear thereon meshing with the pinion.

27. In combination in a mutograph, a selector, means for rotating it, engaging means for stopping the selector in any one of its rotative positions, an electromagnetic winding for operating the said engaging means, a series of pairs of contacts made by the rotation of the selector, a plurality of incomplete circuits each including the winding and one of the pairs of contacts, and means whereby any one of the circuits may be completed and the winding energized to stop the selector in any desired position.

28. In combination in a mutograph, a selector, means for rotating it, engaging means for stopping the selector in any one of its rotative positions, an electromagnetic winding for operating the said engaging means, an electromagnetic winding for releasing the means for rotating the selector, a series of contacts made by the rotation of the selector, a plurality of incomplete circuits each including the two windings and one of the pairs of contacts, and means whereby any one of the circuits may be completed, thereby energizing the windings to release the driving means for the selector and throw in the engaging means.

29. In combination in a mutograph, a selector, releasable means for rotating the selector, a friction brake for slowing up the selector engaging means for stopping the selector in any one of its rotative positions, an electromagnetic winding for operating the said engaging means, an electromagnetic winding for releasing the means for rotating the selector, and throwing in the friction brake, a series of pairs of contacts made by the rotation of the selector, a plurality of incomplete circuits each including the two windings and one of the pairs of contacts, and means whereby any one of the circuits may be completed, thereby energizing the windings, to release the driving means, throw in the friction brake and throw in the engaging means.

30. In a mutograph in combination with an oscillatory frame carrying a rotatable selector provided with a clutch member, of driving means for the selector comprising a clutch member for coöperating with the first clutch member, a vertical drive shaft therefor carried by the oscillating frame and provided with a pinion, and a drive gear lying in a horizontal plane and engaging the pinion, the size of such drive gear and its speed of rotation being such that as the oscillating frame moves in one direction the selector is given a movement of rotation, but on the movement of the oscillatory frame in the other direction is permitted to remain stationary.

In testimony whereof I have hereunto signed my name in the presence of the two subscribed witnesses.

F. C. NEWELL.

Witnesses:
J. C. BRADLEY,
DOERING BELLINGER.